US011156574B2

(12) United States Patent
Kosub et al.

(10) Patent No.: US 11,156,574 B2
(45) Date of Patent: Oct. 26, 2021

(54) APPARATUS FOR CHARACTERIZING THE ELECTRICAL RESISTANCE OF A MEASUREMENT OBJECT

(71) Applicant: Helmholtz-Zentrum Dresden-Rossendorf E.V., Dresden (DE)

(72) Inventors: Tobias Kosub, Dresden (DE); Denys Makarov, Dresden (DE)

(73) Assignee: Helmholtz-Zentrum Dresden-Rossendorf E.V., Dresden (DE)

( * ) Notice: Subject to any disclaimer, the term of this patent is extended or adjusted under 35 U.S.C. 154(b) by 58 days.

(21) Appl. No.: 16/483,937

(22) PCT Filed: Mar. 1, 2018

(86) PCT No.: PCT/EP2018/054992
§ 371 (c)(1),
(2) Date: Aug. 6, 2019

(87) PCT Pub. No.: WO2018/166800
PCT Pub. Date: Sep. 20, 2018

(65) Prior Publication Data
US 2019/0346387 A1   Nov. 14, 2019

(30) Foreign Application Priority Data
Mar. 14, 2017   (DE) .......................... 102017105317.4

(51) Int. Cl.
*G01N 27/04* (2006.01)
*G01N 27/92* (2006.01)

(52) U.S. Cl.
CPC ............. *G01N 27/04* (2013.01); *G01N 27/92* (2013.01)

(58) Field of Classification Search
CPC ............................ G01N 27/04; G01R 1/06766
See application file for complete search history.

(56) References Cited

U.S. PATENT DOCUMENTS

| 5,535,038 A | * | 7/1996 | Hinch | ................... | H04B 10/69 |
| | | | | | 372/38.07 |
| 9,958,442 B2 | | 5/2018 | Angelo et al. | | |

(Continued)

FOREIGN PATENT DOCUMENTS

| CN | 203012015 U | 6/2013 |
| CN | 103210290 A | 7/2013 |

(Continued)

OTHER PUBLICATIONS

International Search Report and Written opinion for International Application No. PCT/EP2018/054992, dated May 24, 2018.

(Continued)

*Primary Examiner* — Noam Reisner
(74) *Attorney, Agent, or Firm* — The Dobrusin Law Firm, P.C.

(57) ABSTRACT

The invention relates to a measuring apparatus for characterizing the electrical resistance of a measurement object, comprising an electric energy source having two poles, a voltage measuring device having two measuring inputs, four connecting contacts for the connection of four contact electrodes, and a switching device for the variable electrical pairwise connection of each one of the poles and measuring inputs to each one of the connecting contacts, forming different wiring configurations, wherein the measuring device is configured to carry out at least two measuring sequences with different wiring configurations and to determine the series resistance of the measurement object by incorporating the current and voltage signals acquired in these wiring configurations.

14 Claims, 4 Drawing Sheets

(56) References Cited

U.S. PATENT DOCUMENTS

Figure 1:
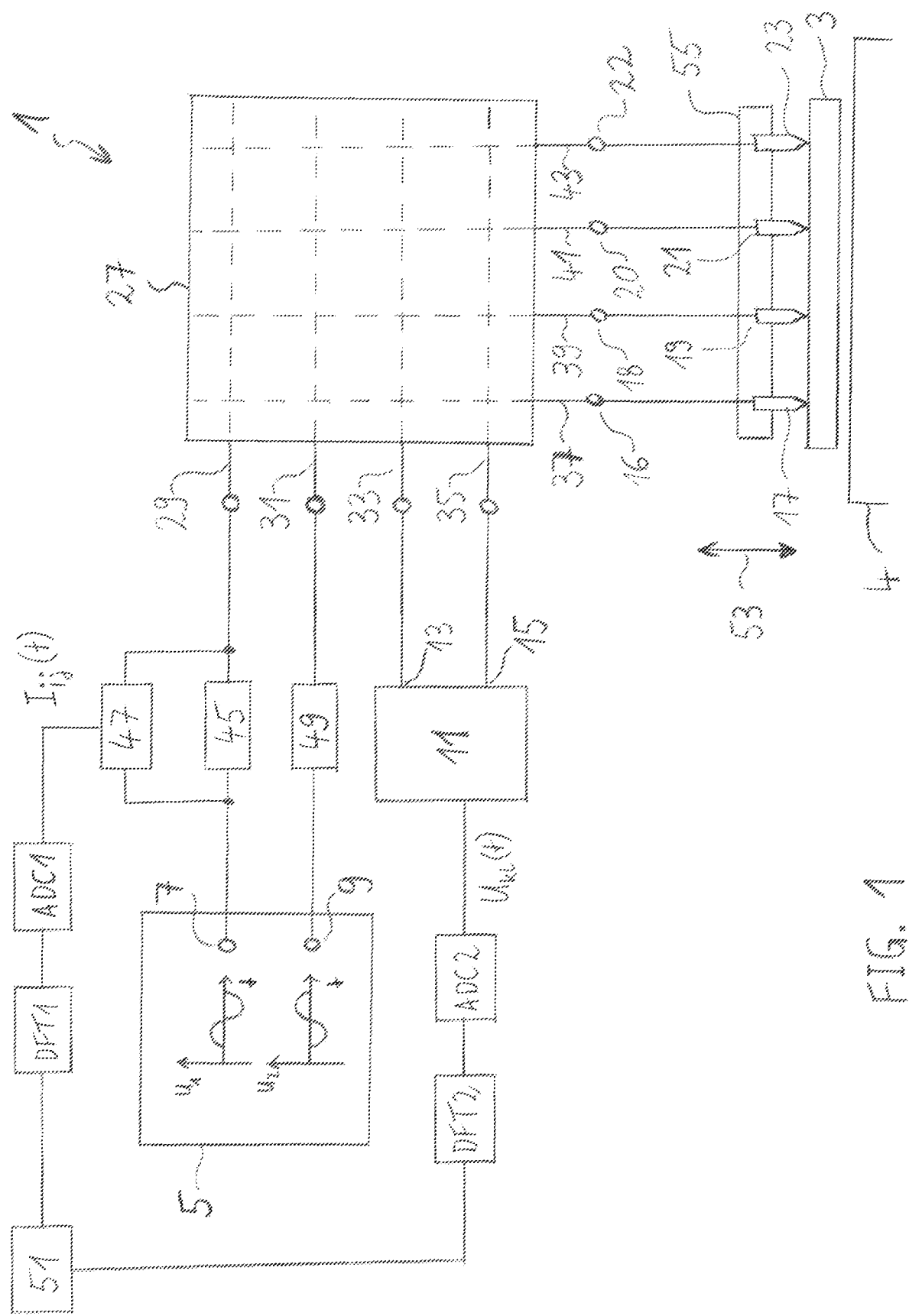

| | | | |
|---|---|---|---|
| 2004/0101027 A1* | 5/2004 | Mende | G01K 7/42 374/152 |
| 2005/0052191 A1* | 3/2005 | Prussin | G01R 31/2648 324/719 |
| 2013/0203201 A1 | 8/2013 | Britton et al. | |
| 2014/0015552 A1 | 1/2014 | Wang et al. | |
| 2015/0142342 A1 | 5/2015 | Huber et al. | |
| 2016/0252589 A1* | 9/2016 | Raman | G01R 33/0029 324/224 |
| 2017/0025552 A1 | 1/2017 | Schmidt et al. | |
| 2018/0095147 A1* | 4/2018 | Gunawan | G01R 33/032 |

FOREIGN PATENT DOCUMENTS

| | | | |
|---|---|---|---|
| CN | 103399044 A | 11/2013 | |
| CN | 103743787 A | 4/2014 | |
| CN | 104897734 A | 9/2015 | |
| CN | 106062954 A | 10/2016 | |
| EP | 3023799 A1 | 5/2016 | |
| WO | 2011/021076 A1 | 4/2011 | |

OTHER PUBLICATIONS

Mary Anne Tupta, Techniques for Measuring the Electrical Resistivity of Bulk Materials, dated Nov. 18, 2010; p. 48 www.testforce.com/testforce_files/NewsEvents/Resistivity-Webinar.

Tal David et al. Novel Analog Switching Circuit for Van Der Pauw Measurements, Retrieved on Feb. 7, 2005. https://arxiv.org/ftp/cond-mat/papers/0502/0502182.pdf.

C. A. M. Dos Santos et al. The van der Pauw method of measurements In high-Tc superconductors; dated Jan. 1, 2009.

Anonymous; Four-Probe Resistivity and Hall Voltage Measurements with the 4200A-SCS Application Note Series, dated Jul. 15, 2011.

Miccoli I et al. The 100th anniversary of the four-point probe technique: the role of probe geometries in isotropic and anisotropic systems, dated May 18, 2015.

Chinese Search Report, CN 201880017425, dated Jun. 10, 2021.

First Chinese Office Action, CN 201880017425, dated Jun. 21, 2021.

Cultrera, Alessandro; Callegaro, Luca, Electrical resistance tomography of conductive thin films, IEEE transactions on instrumentation and measurement, vol. 65, Nr. 9, pp. 2101-2107 (Sep. 2016).

Dos Santos, C. A. M., et al., Procedure for measuring electrical resistivity of anisotropic materials: A revision of the Montgomery method, Journal of Applied Physics, 110, 083703, pp. 1-7 (2011).

M. S. da Luz, Observation of double sign reversal of the hall resistance in Y0, 55Pr 0.45Ba 2Cu 30 7-[delta] polycrystalline samples, pp. 462-463, XP055475107 (Apr. 1, 2006).

He Zhaoxiang et al., A Concise Course on Signals and Systems of the "Thirteenth Five-Year" Planning for Applied Undergraduate Information Majors, pp. 61-65 (Jan. 31, 2017).

Hutanu, VM et al., Negative magnetorezisa tnce of granular Co—Cu films prepared by electrochemical deposition, Proceedings of the Society of Photo-Optical Instrumentation Engineers (SPIE), vol. 4068, pp. 143-148 (Dec. 31, 2000).

* cited by examiner

APPARATUS FOR CHARACTERIZING THE ELECTRICAL RESISTANCE OF A MEASUREMENT OBJECT

The invention relates to a device for characterizing the electrical resistance of a measurement object, in particular for determining the longitudinal resistance of a measurement object.

The characterization of the electrical resistance of measurement objects is important in many areas of industry and science, eg for the characterization of materials or electrical components. The electrical resistance is usually not a scalar quantity, but a tensor with several different components. The resistance tensor links the spatial orientation of the current with the spatial orientation of the voltage. The resistance can be characterized, for example for material layers, by the longitudinal resistance and the transverse resistance. For a current that runs within a layer (and parallel to the layer), the longitudinal resistance characterizes the ratio between the current and the voltage present in parallel with this current, and the transverse resistance characterizes the ratio between the current and the voltage present within the layer (and parallel to the layer) perpendicular to this current. In the present case, the terms resistance, current and voltage refer to the electrical resistance, the electrical current or the electrical voltage, unless something else is apparent from the context. The components of the resistance tensor are also referred to as resistance components.

The individual components of the resistance tensor can be determined, for example, by producing a sample with such a sample geometry for the determination of each individual tensor component and measuring electrically in such a circuit geometry that all components except the individual component to be determined are negligible for the present sample and circuit geometry. The sample used to determine an individual component can be structured, for example, and electrically connected in a four-point measurement such that because of the predetermined current direction and the predetermined voltage tap positions, the resistance is essentially given solely by the individual component to be determined. For example, in the case of a sample in the form of a right-angled cross with four cross arms, in which a current is passed through two opposing arms, the influence of the longitudinal resistance is zero or negligibly small, so that by detecting the resulting voltage between the two other opposing arms, the transverse resistance can be determined.

Thus, each individual component of the resistance tensor can be determined by means of a sample having a corresponding sample geometry. In this case, to determine different components, several samples or measurement objects with different sample geometries must be produced, which entails a corresponding expenditure of time and materials. In addition, due to the limited accuracy of the sample geometries that can be produced, the resistance components determined are also subject to a corresponding inaccuracy. Finally, with this method, different resistance components can only be determined for different sample geometries or sample areas (and not for one and the same sample or one and the same sample area), which results in further inaccuracies.

The invention is intended to provide a device by means of which the electrical resistance, in particular the longitudinal resistance, of a measurement object can be easily characterized with high accuracy. The device can be configured, for example, for the simultaneous determination of the longitudinal and transverse resistance of the measurement object.

According to the invention, a device (hereinafter also referred to as measuring device) for characterizing the electrical resistance of a measuring object is provided. The measuring device can be configured, for example, for determining different components of the resistance tensor, for example for determining the longitudinal resistance and/or the transverse resistance of the measurement object.

The measurement object is preferably designed such that its extent in two of the three spatial dimensions is greater than its extent in the third spatial dimension. In other words, the measurement object is preferably a material layer whose length and width is greater than its thickness. Such a material layer is therefore substantially two-dimensional or can be assumed to be two-dimensional.

The measuring device comprises an electrical power source for providing an electric current as an input current. The power source has a first terminal and a second terminal, the input current being provided between these two electrical terminals. The terminals form the connection points of the power source and are therefore also referred to as the first and second connection terminals. The power source may be an electrical current source, eg a current source for providing a DC current or AC current. Alternatively, the power source may be an electrical voltage source, eg a voltage source for providing a DC voltage or AC voltage.

The measuring device also comprises a voltage measuring device for detecting or measuring an electrical voltage. The voltage measuring device has a first and a second measuring input and is configured to detect the voltage present between these two measuring inputs as an output voltage.

The measuring device comprises at least four connection contacts, wherein each of the connection contacts is provided for electrically connecting to a contact electrode to form an electrical connection between the connection contact and the contact electrode, and wherein the contact electrodes are provided for electrically contacting the measurement object. The measuring device thus has at least a first connection contact for connecting (ie, electrically linking) a first contact electrode thereto, a second connection contact for connecting a second contact electrode thereto, a third connection contact for connecting a third contact electrode thereto, and a fourth connection contact for connecting a fourth contact electrode thereto, wherein the first, second, third and fourth contact electrodes are provided for electrically contacting the measurement object. The measuring device can be By means of the connection contacts the measuring device can be configured, for example, for forming a detachable connection (eg a detachable plug connection) between the connection contacts and the contact electrodes. The measuring device can thus have four connection contacts for forming a detachable electrical connection to one respective contact electrode each. The connection contacts can be designed, for example, as connection sockets.

The measuring device can accordingly comprise at least four electrodes (also referred to as contact electrodes) which are provided for electrically contacting the measurement object. The measuring device can thus have at least a first, a second, a third and a fourth contact electrode. Each of the contact electrodes has an exposed contact point provided for contacting the measurement object. When the measuring device is used as intended, the first contact electrode is connected to the first connection contact to form an electrical connection, the second contact electrode is connected to the second connection contact to form an electrical connection, the third contact electrode is connected to the third connection contact to form an electrical connection, and the fourth contact electrode is connected to the fourth connection contact to form an electrical connection. Moreover, in the intended use of the measuring device all the contact electrodes are in physical contact with the measurement object, wherein the contact point of each contact electrode is in physical contact with the measurement object.

Furthermore, the measuring device comprises a switching device. The switching device is configured for variable pairwise electrical connection of a respective one of the first terminal of the power source, the second terminal of the power source, the first measuring input of the voltage measuring device, and the second measuring input of the voltage measuring device, on the one hand, with a respective one of the first connection contact, the second connection contact, the third connection contact and the fourth connection contact, on the other hand. When the measuring device is used as intended, each of the connection contacts is connected to the respective contact electrode, so that by means of the switching device the measuring device is configured for variable pairwise electrical connection of a respective one of the first terminal, the second terminal, the first measuring input and the second measuring input to a respective one of the first contact electrode, the second contact electrode, the third contact electrode and the fourth contact electrode. Thus, by means of the switching device different electrical connection configurations of the contact electrodes can be realized or formed, wherein in each case the first terminal is electrically connected with one of the four contact electrodes, the second terminal is electrically connected with one of the four contact electrodes (in particular with a different one of the four contact electrodes than the first terminal), the first measuring input is electrically connected with one of the four contact electrodes (in particular with a different one of the four contact electrodes than the first terminal and the second terminal), and the second measuring input is electrically connected with one of the four contact electrodes (in particular with another one of the four contact electrodes as the first terminal, the second terminal and the first measuring input). The switching device is configured for the variable pairwise electrical connection of said elements, ie using the switching device, at least two different connection configurations can be formed.

However, it can also be provided that the switching device is configured to realize more than two connection configurations, eg to realize all possible connection configurations. It can be provided, for example, that the switching device is configured such that the first terminal can be connected to any one of the four connection contacts (and thus to any of the four contact electrodes), the second terminal can be connected to any one of the three remaining connection contacts (and thus to any one of the three remaining contact electrodes), the first measuring input can be connected to any one of the two remaining connection contacts (and thus to any of the two remaining contact electrodes), and the second measuring input can be connected to the sole remaining connection contact (and thus, to the only remaining contact electrode). Here, "connect" or "connection" refers to an electrical connection or an electrical linkage, that is to say the formation of an electrically conductive connection, unless the context dictates otherwise.

During the intended use of the measuring device, the connection contacts in are in contact with the contact electrodes and the contact electrodes are in contact with the measurement object, wherein a current flow is generated in the measurement object by means of the electrical power source. The measuring device is configured in such a way that the input current flowing between the two connection contacts or contact electrodes, which are connected to the two terminals of the power source, can be detected by it as an input current signal. The input current signal describes the input current as a function of time, so that the input current time characteristic is detected by the measuring device as an input current signal.

Due to the introduced input current, a voltage is generated between the other two contact electrodes (that is to say the contact electrodes connected to the two measuring inputs of the voltage measuring device). The voltage present between the two connection contacts or contact electrodes, which are connected to the two measuring inputs of the voltage measuring device, can be detected by the measuring device as an output voltage signal. The output voltage signal describes the output voltage as a function of time, so that the output voltage time characteristic is detected as an output voltage signal by the measuring device using the voltage measuring device.

As different connection configurations of the contact electrodes can be formed by means of the switching device, the input current signal and the output voltage signal can be detected by means of the measuring device for different connection configurations, and based on the plurality of input current signals and the plurality of output voltage signals, the electrical resistance or resistance tensor of the measurement object can be characterized, eg determined. Accordingly, the measuring device may be configured for characterizing or determining different resistance components based on the input current signals and output voltage signals detected for different connection configurations.

The measuring device is configured for performing at least a first and a second measurement sequence with different connection configurations as follows. In this regard, in particular the switching device is configured for variable pairwise electrical connection of a respective one of the first terminal, the second terminal, the first measuring input and the second measuring input, on the one hand, with a respective one of the four connection contacts (and thus with a respective one of the four contact electrodes), on the other hand, such that the connection configurations required for the first and second measurement sequences can be realized by the measuring device. The first and second measurement sequences can be performed in any order.

In the first measurement sequence, by means of the switching device, the first connection contact (and thus, when the measuring device is used as intended, the first contact electrode) is electrically connected to one of the two terminals of the power source, the second connection contact (or the second contact electrode) is electrically connected to the other of the two terminals of the power source, the third connection contact (or the third contact electrode) is electrically connected to one of the two measuring inputs of the voltage measuring device, and the fourth connection contact (or the fourth contact electrode) is electrically connected to the other of the two measuring inputs of the voltage measuring device. Accordingly, in the first measurement sequence, the input current is present between the first and the second connection contact (or between the first and the second contact electrode) and is detected by the measuring device as a first input current signal. By means of the voltage measuring device, the voltage present between the third and fourth connection contact (or between the third and fourth contact electrode) is detected as a first output voltage signal in the first measurement sequence.

In the second measurement sequence, by means of the switching device, the third connection contact (or the third contact electrode) is electrically connected to one of the two terminals of the power source, the fourth connection contact (or the fourth contact electrode) is electrically connected to the other of the two terminals of the power source, the first connection contact (or the first contact electrode) is electrically connected to one of the two measuring inputs of the voltage measuring device, and the second connection contact (or the second contact electrode) is electrically connected to the other of the two measuring inputs of the voltage measuring device. Accordingly, in the second measuring sequence, the input current is present between the third and the fourth connection contact (or between the third and the fourth contact electrode) and is detected by the measuring device as a second input current signal. In the second measuring sequence, the voltage present between the first and second connection contact (or between the first and second contact electrode) is detected as a second output voltage signal by means of the voltage measuring device.

The measuring device is configured, for example by means of an appropriately configured evaluation device, for determining the longitudinal resistance and/or the transverse resistance of the measurement object taking into account the first and the second input current signal and the first and the second output voltage signal. On the basis of the detected input current signals and output voltage signals, the determination of the longitudinal resistance and also the simultaneous determination of the longitudinal and the transverse resistance is made possible for one and the same measurement object, whereby the uncomplicated determination of these resistance components with high accuracy is made possible. In particular, the longitudinal and the transverse resistance can be determined simultaneously without changing the sample or the measurement object.

The measuring device may for example be designed such that
- in the first measuring sequence, the first connection contact (or the first contact electrode) is electrically connected to the first terminal, the second connection contact (or the second contact electrode) is electrically connected to the second terminal, the third connection contact (or the third contact electrode) is electrically connected to the first measuring input and the fourth connection contact (or the fourth contact electrode) is electrically connected to the second measuring input, and
- in the second measuring sequence, the third connection contact (or the third contact electrode) is electrically connected to the first terminal, the fourth connection contact (or the fourth contact electrode) is electrically connected to the second terminal, the second connection contact (or the second contact electrode) is electrically connected to the first measuring input and the first connection contact (or the first contact electrode) is electrically connected to the second measuring input, or
- in the second measuring sequence the fourth connection contact (or the fourth contact electrode) is electrically connected to the first terminal, the third connection contact (or the third contact electrode) is electrically connected to the second terminal, the first connection contact (or the first contact electrode) is electrically connected to the first measuring input and the second connection contact (or the second contact electrode) is electrically connected to the second measuring input.

By this choice of connection configurations, in the first measurement sequence the same handedness between introduced current and tapped voltage is realized as in the second measurement sequence, ie the same relative orientation of the introduced current to the tapped voltage (this orientation can be illustrated by the orientation of the connection direction which points from the contact electrode connected to the first terminal to the contact electrode connected to the second terminal, relative to the connection direction which points from the contact electrode connected to the first measuring input to the contact electrode connected to the second measuring input). By having the same handedness in the first measurement sequence as in the second measurement sequence, high-precision detection of the longitudinal and/or transverse resistance can be carried out in an uncomplicated manner.

According to an embodiment, the measuring device is configured to determine a first resistance value from the first output voltage signal and the first input current signal and to determine a second resistance value from the second output voltage signal and the second input current signal. The manner of calculating the resistance values for different connection configurations will be explained in more detail below.

For a given connection configuration, the resistance value is determined from the output voltage signal present in this connection configuration and the input current signal present in this connection configuration. In the following, (i, j, k, l) designates the connection configuration in which the first terminal of the power source is electrically connected to the i-th connection contact (or to the i-th contact electrode), the second terminal of the power source is electrically connected to the j-th connection contact (or to the j-th contact electrode), the first measuring input of the voltage measuring device is electrically connected to the k-th connection contact (or to the k-th contact electrode), and the second measuring input of the voltage measuring device is electrically connected to the l-th connection contact (or to the l-th contact electrode), so that when the measuring device is used as intended, the input current $I_{ij}$ flows between the i-th and the j-th contact electrode and the output voltage $U_{kl}$ is tapped between the k-th and the l-th contact electrode. The resistance value present in the connection configuration (i, j, k, l) is denoted by $R_{ijkl}$.

In the case where the input current is a direct current, for the connection configuration (i, j, k, l), the resistance value $R_{ijkl}$ is given by the quotient of the output voltage $U_{kl}$, which is present between the k-th contact electrode and the l-th contact electrode (and thus between the k-th connection contact and the l-th connection contact), and the input current which flows between the i-th contact electrode and the j-th contact electrode (and thus between the i-th connection contact and the j-th connection contact), so that the resistance value $R_{ijkl}$ can be written as $$R_{ijkl} = U_{kl}/I_{ij} \quad (1)$$

In the case that the input current is an (eg periodic) alternating current, the input current $I_{ij}(t)$ present between the i-th and the j-th contact electrodes (and thus also between the i-th and the j-th connection contacts) may be written as a Fourier series of form $$I_{ij}(t) = \Sigma_n I_{ij}^n \cdot \sin(n \cdot \omega \cdot t + \varphi_{ij}^n) \quad (2)$$

and the output voltage $U_{w}(t)$ present between the k-th and the l-th contact electrodes (and thus also between the k-th and the l-th connection contacts) may be written in the form of a Fourier series $$U_{kl}(t) = \Sigma_n U_{kl}^n \cdot \sin(n \cdot \omega \cdot t + \varphi_{kl}^n) \quad (3)$$

where ω denotes the fundamental frequency, t denotes the time, n is a natural number, $I_{ij}^n$ and $U_{kl}^n$ designate the amplitudes of the respective frequency component at the frequency n·ω, and $\varphi_{ij}^n$ and $\varphi_{kl}^n$ designate a phase of the respective frequency component (which indicates the initial phase at time t=0).

With these designations, the resistance value $R_{ijkl}$ for the connection configuration (i, j, k, l) results from the frequency components of the Fourier series belonging to n=1 for $I_{ij}(t)$ and $U_{kl}(t)$, wherein the resistance value $R_{ijkl}$ becomes a complex resistance value of the form $$R_{ijkl}=\text{Re}(R_{ijkl})+t\cdot\text{Im}(R_{ijkl}) \quad (4)$$

where $\text{Re}(R_{ijkl})$ denotes the real part and $\text{Im}(R_{ijkl})$ denotes the imaginary part, and where the real part is given by $$\text{Re}(R_{ijkl})=U_{kl}^1\cdot\cos(\varphi_{ij}^1-\varphi_{kl}^1)/I_{ij}^1 \quad (5)$$

and the imaginary part is given by $$\text{Im}(R_{ijkl})=U_{kl}^1\cdot\sin(\varphi_{ij}^1-\varphi_{kl}^1)/I_{ij}^1 \quad (6)$$

Thus, if the input current is an alternating current, the resistance elements $R_{ijkl}$ are complex resistance elements and are therefore also referred to as impedance elements.

Thus, the resistance elements $R_{ijkl}$ result from the frequency components corresponding to the fundamental frequency ω of the output voltage signal $U_{kl}(t)$ and the input current signal $I_{ij}(t)$, which are also referred to as fundamental frequency components. The real part of the resistance element $R_{ijkl}$ results from the quotient of the amplitude $U_{kl}^1$ of the fundamental frequency component of the output voltage signal and the amplitude $I_{ij}^1$ of the fundamental frequency component of the input current signal, this quotient being multiplied by the cosine of the difference between the initial phase $\varphi_{ij}^1$ of the fundamental frequency component of the input current signal and the initial phase $\varphi_{kl}^1$ of the fundamental frequency component of the output voltage signal. The imaginary part of the resistance element $R_{ijkl}$ results from the quotient of the amplitude $U_{kl}^1$ of the fundamental frequency component of the output voltage signal and the amplitude $I_{ij}^1$ of the fundamental frequency component of the input current signal, this quotient being multiplied by the sine of the difference between the initial phase $\varphi_{ij}^1$ of the fundamental frequency component of the input current signal and the initial phase $\varphi_{kl}^1$ of the fundamental frequency component of the output voltage signal.

The measuring device can be configured by means of the above-explained first and second measurement sequence, for example, to determine $R_{1234}$ as the first resistance element and $R_{3421}$ or $R_{4312}$ as the second resistance element.

The (averaged or half) sum of the first resistance value and the second resistance value is proportional to the transverse resistance of the measurement object and thus forms a measure of the transverse resistance. The (averaged or half) difference between the first resistance value and the second resistance value is proportional to the longitudinal resistance of the measurement object and thus forms a measure of the longitudinal resistance. The respective proportionality factors result from the respective connection geometry and can be determined, for example, on the basis of the known geometry of the measurement object or by measurement on a reference sample with known resistance tensor and comparison of the measurement result with the known resistance components.

Accordingly, it can be provided that the measuring device is configured to determine the longitudinal resistance and/or the transverse resistance of the measurement object based on the first resistance value and the second resistance value. It can be provided in particular that the measuring device is configured to determine the longitudinal resistance of the measurement object based on the difference between the first resistance value and the second resistance value and/or to determine the transverse resistance of the measurement object based on the sum of the first resistance value and the second resistance value.

According to the above embodiment, therefore, according to equation (1) for the direct current case or according to equations (2) to (6) for the alternating current case, for example, the first resistance value can be determined as $R_{1234}$ and the second resistance value can be determined as $R_{3421}$, wherein the longitudinal resistance $R_{long}$ of the measurement object can eg be determined by means of $$R_{long}=P_1\cdot(R_{1234}-R_{3421})/2\sim(R_{1234}-R_{3421}) \quad (7)$$

and the transverse resistance or transversal resistance $R_{trans}$ of the measurement object can, for example, be determined by means of $$R_{trans}=P_2\cdot(R_{1234}+R_{3421})/2\sim(R_{1234}+R_{3421}) \quad (8)$$

where $P_1$ and $P_2$ are proportionality factors, and where the character "∼" represents the proportionality sign. The measuring device can thus be configured, for example by means of an appropriately configured evaluation device, for determining the longitudinal resistance $R_{long}$ and/or the transverse resistance $R_{trans}$ on the basis of equations (7) and (8), respectively, in conjunction with equation (1) for the DC case and with the equations (2) to (6) for the AC case.

According to a further embodiment, the measuring device is configured, in addition to the first and second measuring sequence, for performing at least a third and fourth measuring sequence with different connection configurations as follows. In this regard, in particular the switching device is configured for variable pairwise electrical connection of respectively one of the first terminal, the second terminal, the first measuring input and the second measuring input, on the one hand, with respectively one of the four connection contacts (and thus with one of the four contact electrodes), on the other hand, such that the connection configurations required for the first, second, third and fourth measurement sequence can be realized by the measuring device. The first, second, third and fourth measurement sequences can be performed in any order.

According to this embodiment, in the first measuring sequence by means of the switching device, the first connection contact (and thus, when the measuring device is used as intended, the first contact electrode) is electrically connected with the first terminal of the power source, the second connection contact (or the second contact electrode) is electrically connected to the second terminal of the power source, the third connection contact (or the third contact electrode) is electrically connected to the first measuring input of the voltage measuring device, and the fourth connection contact (or the fourth contact electrode) is electrically connected to the second measuring input of the voltage measuring device, wherein the input current is present between the first and the second contact electrode (and thus between the first and second connection contact) and is detected as a first input current signal ($I_{12}$), and wherein by means of the voltage measuring device the voltage generated between the third and the fourth contact electrode (and thus between the third and fourth connection contact) is detected as the first output voltage signal ($U_{34}$).

According to this embodiment, in the second measuring sequence by means of the switching device, the third connection contact (or the third contact electrode) is electrically connected to the first terminal of the power source, the fourth connection contact (or the fourth contact electrode) is electrically connected to the second terminal of the power source, the second connection contact (or the second contact electrode) is electrically connected to the first measuring input of the voltage measuring device, and the first connection contact (or the first contact electrode) is electrically connected to the second measuring input of the voltage measuring device, wherein the input current is present between the third and the fourth contact electrode (and thus between the third and fourth connection contact) and is detected as a second input current signal ($I_{34}$), and wherein by means of the voltage measuring device the voltage generated between the first and the second contact electrode (and thus between the first and second connection contact) is detected as a second output voltage signal ($U_{21}$).

In the third measuring sequence, by means of the switching device the second connection contact (or the second contact electrode) is electrically connected to the first terminal of the power source, the first connection contact (or the first contact electrode) is electrically connected to the second terminal of the power source, the fourth connection contact (or the fourth contact electrode) is electrically connected to the first measuring input of the voltage measuring device, and the third connection contact (or the third contact electrode) is electrically connected to the second measuring input of the voltage measuring device, wherein the input current is present between the second and first contact electrode (and thus between the second and first connection contact) and is detected as a third input current signal ($I_{21}$), and wherein by means of the voltage measuring device the voltage between the fourth and the third contact electrode (and thus between the fourth and third connection contact) is detected as a third output voltage signal ($U_{43}$).

In the fourth measuring sequence, by means of the switching device the fourth connection contact (or the fourth contact electrode) is electrically connected to the first terminal of the power source, the third connection contact (or the third contact electrode) is electrically connected to the second terminal of the power source, the first connection contact (or the first contact electrode) is electrically connected to the first measuring input of the voltage measuring device, and the second connection contact (or the second contact electrode) is electrically connected to the second measuring input of the voltage measuring device, wherein the input current is present between the fourth and the third contact electrode (and thus between the fourth and the third connection contact) and is detected as a fourth input current signal ($I_{43}$), and wherein by means of the voltage measuring device the voltage generated between the first and second contact electrode (and thus between the first and second connection contact) is detected as a fourth output voltage signal ($U_{12}$).

According to this embodiment, the measuring device can be configured, for example by means of a suitably configured evaluation device, for determining the longitudinal resistance and/or the transverse resistance of the measurement object taking into account the first, second, third and fourth input current signal as well as the first, second, third and fourth output voltage signal.

According to an embodiment, the measuring device is configured for determining a first resistance value from the first output voltage signal and the first input current signal, a second resistance value from the second output voltage signal and the second input current signal, a third resistance value from the third output voltage signal and the third input current signal, and a fourth resistance value from the fourth output voltage signal and the fourth input current signal.

It can be provided, for example, that the measuring device is configured for determining the first resistance value $R_{1234}$ from the first output voltage signal and the first input current signal, the second resistance value $R_{3421}$ from the second output voltage signal and the second input current signal, the third resistance value $R_{2143}$ from the third output voltage signal and the third input current signal, and the fourth resistance value $R_{4312}$ from the fourth output voltage signal and the fourth input current signal according to equation (1) for the DC case and according to equations (2) to (6) for the AC case, respectively.

The (averaged or quarter) sum of the first, second, third and fourth resistance values is proportional to the transverse resistance of the measurement object and thus forms a measure of the transverse resistance. The (averaged or quarter) sum in which the two resistance values $R_{1234}$ and $R_{2143}$ for the input current between the first and the second contact electrode are entered with a positive sign and the two resistance values $R_{3421}$ and $R_{4312}$ for the input current between the third and the fourth contact electrode are entered with a negative sign (also referred to as "alternating sum") is proportional to the longitudinal resistance of the measurement object and thus forms a measure of the longitudinal resistance. The respective proportionality factors result from the respective connection geometry and can be determined, for example, on the basis of the known geometry of the measurement object or by measurement on a reference sample with known resistance tensor and comparison of the measurement result with the known resistance components.

Accordingly, it can be provided that the measuring device is configured (eg by means of an appropriately configured evaluation device) for determining the longitudinal resistance and/or the transverse resistance of the measurement object based on the first, second, third and fourth resistance values. It can be provided in particular that the measuring device is configured to determine the transverse resistance of the measurement object based on the sum of the first, the second, the third and the fourth resistance values. In addition, it can be provided that the measuring device is designed to determine the longitudinal resistance of the measurement object based on the alternating sum of the first, the second, the third and the fourth resistance values.

According to the notation explained above, the measuring device can thus be configured to determine the longitudinal resistance $R_{long}$ and/or the transverse resistance $R_{trans}$ on the basis of the following equations:

$$R_{long} = P_1 \cdot (R_{1234} - R_{3421} + R_{2143} - R_{4312})/4 \sim (R_{1234} - R_{3421} + R_{2143} - R_{4312}) \quad (9)$$

$$R_{trans} = P_2 \cdot (R_{1234} + R_{3421} + R_{2143} + R_{4312})/4 \sim (R_{1234} + R_{3421} + R_{2143} + R_{4312}) \quad (10)$$

where $P_1$ and $P_2$ are proportionality factors.

In the specified connection configurations—even when the input current is an alternating current—the assignment of the respective contact electrode to the respective terminal or measuring input is to be noted, wherein for example is not identical to $R_{jikl}$ or $R_{ijlk}$. This ensures that the same handedness between introduced current and tapped voltage is present in all measurement sequences, whereby a highly accurate detection of the longitudinal and/or transverse resistance can be carried out in an uncomplicated manner. The input current may be a direct current or an alternating current. The consideration of four resistance values allows a higher measurement accuracy, both in the case that the input current is a direct current and in the case that the input current is an alternating current.

The measuring device may be configured for storing the detected input current signals (ie, the detected input current time courses) and the detected output voltage signals (ie, the detected output voltage time courses) in a data memory such that these detected signals are subsequently available as raw data for determining different components of the resistance tensor of the measurement object. The measuring device can thus be configured in particular for storing the first, second, third and/or fourth input current signal as well as for storing the first, second, third and/or fourth output voltage signal by means of a data memory. As a result, for example, the longitudinal resistance and/or the transverse resistance of the measurement object can be determined by the measuring device based on the stored signals by means of different calculation types. It can be provided, for example, to analyse the stored input current signals and/or output voltage signals by means of a Fourier transform (see below).

Alternatively or additionally, the measuring device may be configured for storing the determined resistance values (eg the first, second, third and/or fourth resistance value) in a data memory so that these determined resistance values are subsequently available as raw data for determining different components of the resistance tensor of the measurement object. As a result, for example, the longitudinal resistance and/or the transverse resistance of the measurement object can be determined by the measuring device based on the stored resistance values by means of different calculation types.

The measuring device is configured for detecting the electric current flowing between the first terminal and the second terminal of the electric power source as an input current signal. In addition, the measuring device is configured for detecting the electrical voltage present between the first measuring input and the second measuring input of the voltage measuring device as an output voltage signal. When configuring the input current signal as an alternating current signal, the measuring device can be configured, for example by means of an appropriately configured evaluation device, for processing or analysing the input current signals and/or output voltage signals by means of a Fourier transform. The measuring device can also be configured for characterizing the longitudinal resistance and/or the transverse resistance of the measurement object based on the Fourier-transformed input current signals and/or the Fourier-transformed output voltage signals.

According to an embodiment, the measuring device is configured for Fourier transforming the output voltage signal and/or for Fourier transforming the input current signal. Accordingly, the measuring device is configured for Fourier transforming the detected input current signals (eg the first, second, third or fourth input current signal) and/or output voltage signals (eg the first, second, third or fourth output voltage signal); preferably both the input current signals and the output voltage signals are subjected to a Fourier transform.

The input current signal describes the variation of the input current as a function of time and the output voltage signal describes the variation of the output voltage as a function of time, so that these are time signals. By means of the Fourier transform (also referred to as Fourier analysis), the respective time signal is assigned a frequency spectrum that describes which frequencies are included at which proportions in the original time signal. The measuring device can thus be configured in such a way that it transforms the input current signal into a Fourier-transformed input current signal according to equation (2) by means of the Fourier transform, and/or that it transforms the output voltage signal into a Fourier-transformed output voltage signal according to equation (3) by means of the Fourier transform. By means of the Fourier analysis, for example, distortions of the signal profiles (in particular of the detected voltage profiles) can be detected, as a result of which, for example, underlying physical effects can be characterized. In particular, the harmonic distortions of the output voltage signals provide information about effects that determine the electrical properties, where also effects with only slight influence can be detected. By means of the Fourier-transformed signals, it is thus possible to obtain further information about the resistance of the measurement object, for example about the current dependence of the electrical resistance.

By means of the Fourier transform, for example, an analysis of the nonlinear electrical behaviour of the measurement object can be carried out. If the measurement object has a nonlinear electrical resistance, its resistance changes as a function of the current flow, so that, for example, with a sinusoidal input current, the resistance at the tips of the sine wave can have a higher or lower value than at the zero crossings of the sine wave. These and similar non-linear electrical properties lead to non-linear distortions of the sine wave or in the output voltage signal. This results in harmonic distortions in the Fourier-transformed output voltage signal, so that, for example, in the case of a sinusoidal input current signal having the fundamental frequency $\omega$, the Fourier-transformed output voltage signal in addition to the fundamental frequency $\omega$ also contains portions at integer multiples $n \cdot \omega$ of of this fundamental frequency (where portions whose frequency $n \cdot \omega$ is an integer multiple of the fundamental frequency $\omega$ are also referred to as harmonics, and where n is a natural number denoting the order of harmonics at the frequency $n \cdot \omega$).

It can be provided, for example, that based on the Fourier-transformed input current signals and/or the Fourier-transformed output voltage signals the measuring device is configured for determining the longitudinal resistance and/or the transverse resistance of the measurement object for different frequencies or harmonic orders, whereby the dependence of the longitudinal resistance or the transverse resistance on the strength of the electric current is detectable.

The input current may be in the form of an alternating current, eg in the form of a harmonic alternating current (ie an alternating current following a sine function). When the input current signal is given by a harmonic alternating current with a given fundamental frequency, the output voltage signal may have components at that fundamental frequency as well as at integer multiples of this fundamental frequency. When the input current signal is composed of multiple harmonic alternating currents having different fundamental frequencies, the output voltage signal may have components at these different fundamental frequencies as well as at integer multiples of these different fundamental frequencies. By comparing the frequency spectra of the input current signals and the output voltage signals, conclusions can be drawn about the resistance of the measurement object and its causes. In particular, the measuring device may be configured for determining the longitudinal and/or transverse resistance of the measurement object for different frequencies or harmonic orders based on the Fourier-transformed input current signals and the Fourier-transformed output voltage signals.

For example, if the input current signal is a harmonic alternating current with the fundamental frequency $\omega$, the input current signal may be written in the form $$I_{ij}(t) = A_{ij} \cdot \sin(\omega \cdot t) \tag{11}$$

and the output voltage signal in the form $$U_{kl}(t)=\Sigma_n B_{kl}{}^n\cdot\sin(n\cdot\omega\cdot t+\varphi_{kl}{}^n) \quad (12)$$

(see also equations (2) and (3)).

Thus, analogously to equations (4) to (6), harmonic-dependent complex resistance elements $R_{ijkl}{}^n$ of the form $$R_{ijkl}{}^n=\mathrm{Re}(R_{ijkl}{}^n)+i\cdot\mathrm{Im}(R_{ijkl}{}^n) \quad (13)$$

may be formed, where $\mathrm{Re}(R_{ijkl}{}^n)$ denotes the real part and $\mathrm{Im}(R_{ijkl}{}^n)$ denotes the imaginary part, and wherein the real part is given by $$\mathrm{Re}(R_{ijkl}{}^n)=B_{kl}{}^n\cdot\cos(-\varphi_{kl}{}^n)/A_{ij} \quad (14)$$

and the imaginary part is given by $$\mathrm{Im}(R_{ijkl}{}^n)=B_{kl}{}^n\cdot\sin(-\varphi_{kl}{}^n)/A_{ij} \quad (15)$$

According to an embodiment, the measuring device is thus configured such that it provides an input current in the form of a harmonic alternating current with an input current amplitude ($A_{ij}$) and an input current frequency ($\omega$), wherein the frequency of the harmonic input current is also referred to as the fundamental frequency. It can be provided that the amplitude and the fundamental frequency of the input current are predetermined or detected by the power source. However, it can also be provided that the measuring device is configured for Fourier-transforming the input current signals and determining the input current amplitude and the fundamental frequency from the Fourier-transformed input current signals. According to this embodiment, the measuring device is further configured for Fourier-transforming the output voltage signals and for detecting the individual frequency components of each Fourier-transformed output voltage signal, each of these frequency components being represented by an amplitude ($B_{kl}{}^n$), a phase and a frequency ($\varphi_{kl}{}^n=n\cdot\omega$) (wherein the frequency $\omega_n$ corresponds to the fundamental frequency or an integer multiple thereof).

The measuring device can also be configured for determining the first, second, third and/or fourth resistance element $R_{ijkl}{}^n$ present for a given harmonic order n according to the equations (11) to (15). Accordingly, the resistance elements $R_{ijkl}{}^n$ associated with the harmonic order n result from the frequency components of the input current signal $I_{ij}(t)$ corresponding to the fundamental frequency $\omega$ and the frequency components of the output voltage signal $U_{kl}(t)$ corresponding to the harmonic frequency $\omega_n=n\cdot\omega$. The real part of the resistance element $R_{ijkl}{}^n$ results from the quotient of the amplitude $B_{kl}{}^n$ of the respective harmonic component of the output voltage signal and the amplitude $A_{ij}$ of the fundamental frequency component of the input current signal, this quotient being multiplied by the cosine of the negative initial phase of the harmonic component of the output voltage signal. The imaginary part of the resistance element $\varphi_{kl}{}^n$ results from the quotient of the amplitude $B_{kl}{}^n$ of the respective harmonic component of the output voltage signal and the amplitude $A_{ij}$ of the fundamental frequency component of the input current signal, this quotient being multiplied by the sine of the negative initial phase $\varphi_{kl}{}^n$ of the harmonic component of the output voltage signal.

The measuring device can also be configured, analogously to the embodiments described with reference to equations (7) to (10), for determining the longitudinal and/or transverse resistance present for a plurality of different harmonic orders n.

It can be provided, for example, that the measuring device is configured for determining the longitudinal resistance and/or transverse resistance of the measurement object associated with a given harmonic order n based on the first and second resistance values belonging to the given harmonic order. It can be provided, in particular, that the measuring device is configured for determining the longitudinal resistance of the measurement object associated with the given harmonic order based on the difference between the first and second resistance values belonging to the given harmonic order, and/or that the measurement device is configured for determining the transverse resistance of the measurement object associated with a given harmonic order based on the sum of the first and second resistance values belonging to the given harmonic order.

Accordingly, the measuring device can eg (analogous to the equations (7) and (8)), based on the harmonic-dependent resistance elements $R_{ijkl}{}^n$, be configured for determining the harmonic-dependent longitudinal resistance $R_{long}{}^n$ and/or the harmonic-dependent transverse resistance $R_{trans}{}^n$ according to the following equations:

$$R_{long}{}^n=P_1\cdot(R_{1234}-R_{3421})/2\sim(R_{1234}-R_{3421}). \quad (16)$$

$$R_{trans}{}^n=P_2\cdot(R_{1234}+R_{3421})/2\sim(R_{1234}+R_{3421}) \quad (17)$$

Alternatively, it can be provided that the measuring device is configured for determining the longitudinal resistance and/or transverse resistance of the measurement object for a given harmonic order n based on the first, second, third and fourth resistance values belonging to the given harmonic order. It can be provided, in particular, that the measuring device is configured for determining the longitudinal resistance of the measurement object associated with a given harmonic order based on the alternating sum of the first, second, third and fourth resistance values belonging to the given harmonic order. Alternatively or additionally, it can be provided that the measuring device is configured for determining the transverse resistance of the measurement object associated with a given harmonic order based on the sum of the first, second, third and fourth resistance values belonging to the predetermined harmonic order.

Accordingly, the measuring device can eg (analogous to the equations (9) and (10)) be configured for determining the harmonic-dependent longitudinal resistance $R_{long}{}^n$ and/or the harmonic-dependent transverse resistance $R_{trans}{}^n$ based on the harmonic-dependent resistance elements $R_{ijkl}{}^n$ according to the following equations:

$$R_{long}{}^n=P_1\cdot(R_{1234}-R_{3421}+R_{2143}-R_{4312})/4\sim(R_{1234}-R_{3421}+R_{2143}-R_{4312}) \quad (18)$$

$$R_{trans}{}^n=P_2\cdot(R_{1234}+R_{3421}+R_{2143}+R_{4312})/4\sim(R_{1234}+R_{3421}+R_{2143}+R_{4312}) \quad (19)$$

Thus, in the case of a harmonic or sinusoidal shape of the input current signal, the individual distortion orders can be detected as separate frequency components by means of the Fourier analysis. All of these distortion orders can be based on different effects, which can be differentiated and separated from each other by such an analysis. A corresponding generalization is possible for the case where the input current signals consist of several harmonic alternating current signals with different fundamental frequencies.

The measuring device can be configured, for example, for Fourier-transforming the input current signals and/or the output voltage signals by means of discrete Fourier transformation (also referred to as DFT). Accordingly, the measuring device can be configured for detecting or providing the input current signals and the output voltage signals in the form of digital signals (eg by means of one or more analogue-to-digital converters and digital-to-analogue converters).

Hereinafter, some possible configurations and contact configurations of the power source, the switching device and the contact electrodes as well as some possible configurations for detecting the input current signals will be described.

According to an embodiment, the switching device comprises at least a first, a second, a third and a fourth electrical input contact and at least a first, a second, a third and a fourth electrical output contact. According to this embodiment, the first input contact of the switching device is electrically connected to the first terminal of the power source, the second input contact of the switching device is electrically connected to the second terminal of the power source, the third input contact of the switching device is electrically connected to the first measuring input of the voltage measuring device, and the fourth input contact of the switching device is electrically connected to the second measuring input of the voltage measuring device. In addition, the first output contact of the switching device is electrically connected to the first connection contact, the second output contact of the switching device is electrically connected to the second connection contact, the third output contact of the switching device is electrically connected to the third connection contact, and the fourth output contact of the switching device is electrically connected to the fourth connection contact. Thus, when the measuring device is used as intended, the first output contact of the switching device is electrically connected to the first contact electrode, the second output contact of the switching device is electrically connected to the second contact electrode, the third output contact of the switching device is electrically connected to the third contact electrode, and the fourth output contact of the switching device is electrically connected to the fourth contact electrode. The switching device according to this embodiment is configured for the variable pairwise electrical connection of one each of the four input contacts with one each of the four output contacts. According to this embodiment, the switching device is configured for variable pairwise connection of a respective one of the first terminal, the second terminal, the first measuring input and the second measuring input with a respective one of the four connection contacts (or with one of the four contact electrodes) in that the switching device is configured for variable pairwise electrical connection of a respective one of the four input contacts on the one hand to a respective one of the four output contacts on the other hand. This allows for an uncomplicated realization and integration of the switching device.

The power source may be a current source, eg, a DC current source or an AC current source. However, it can also be provided that the power source is a voltage source, for example a DC voltage source or an AC voltage source. If the power source is a DC current source or a DC voltage source, the input current is a DC current. If the power source is an AC current source or an AC voltage source, the input current is an AC current.

When the power source is a voltage source it can be provided that one of the two terminals of the voltage source is connected to an electrical reference potential, for example to the ground potential of the measuring device. When the voltage source is a DC voltage source, the measuring device may for example be configured such that one of the two terminals of the voltage source is connected to the ground potential, wherein the voltage source is configured for supplying the other of the two terminals with a DC voltage potential or with a DC voltage. When the voltage source is an AC voltage source, the measuring device may be configured, for example, such that one of the two terminals of the voltage source is connected to the ground potential, wherein the voltage source is configured for supplying the other of the two terminals with an AC voltage potential or with an AC voltage.

When the voltage source is an AC voltage source, it may alternatively be provided that the AC voltage source is configured for applying mutually opposite-phase alternating voltages to the two terminals (where the voltage present at a a terminal is always understood to be the voltage or potential difference between this terminal and the ground potential). According to this embodiment, therefore, the alternating voltage applied to the first terminal is opposite in phase to the alternating voltage applied to the second terminal, so that the alternating voltage applied to the first terminal and the alternating voltage applied to the second terminal always have the same magnitude but different signs. Such symmetrical energization contributes to a high measuring accuracy.

The measuring device may comprise a current measuring device for detecting the electric current present between the first and the second terminal of the power source as an input current signal. It can be provided, for example, that for detecting the input current signal the measuring device comprises one or more electrical resistors (ie electrical components in the form of a resistor or resistor components) which are arranged in the current path of the input current. The measuring device can be configured, for example, for tapping or detecting the voltage drop across such a resistor component as a measuring voltage and determining the input current signal based on the detected measuring voltage, and for example the known electrical resistance value of the resistor component (eg by forming the input current signal as the quotient of the measuring voltage and the resistance value). Such a resistor component is also referred to as a measuring resistor.

According to an embodiment, the measuring device accordingly comprises at least one resistor component which is connected in series with one of the two terminals of the power source between this terminal and the connection contacts (and thus also between this terminal and the contact electrodes). It can be provided, for example, that the resistor component is connected in series with one of the two terminals between this terminal and the switching device. Accordingly, the measuring device may, for example, comprise a resistor component which is connected in series with the first terminal of the power source between the first terminal and the connection contacts (and thus also between the first terminal and the contact electrodes), wherein the resistor component can for example be switched between the first terminal and the switching device. Alternatively or additionally, the measuring device may, for example, comprise a resistor component which is connected in series with the second terminal of the power source between the second terminal and the connection contacts (and thus also between the second terminal and the contact electrodes), wherein the resistor component can for example be switched between the second terminal and the switching device. It can be provided, for example, that the measuring device comprises a resistor component which is connected in series with the first terminal of the power source between the first terminal and the first input contact of the switching device. Alternatively or additionally, it can be provided that the measuring device comprises a resistor component which is connected in series with the second terminal of the power source between the second terminal and the second input contact of the switching device.

According to an embodiment, the measuring device comprises two resistor components with the same resistance value (eg two identically designed resistor components), the first of these two resistor components being connected in series with the first terminal of the power source between the first terminal and the connection contacts (eg between the first terminal and the switching device), and the second of these two resistor components being connected in series with the second terminal of the power source between the second terminal and the connection contacts (eg between the second terminal and the switching device). It can be provided, for example, that the measuring device comprises two resistor components with the same resistance value (eg two identically configured resistor components), wherein the first of these two resistor components is connected in series with the first terminal of the power source between the first terminal and the first input contact of the switching device, and wherein the second of these two resistor components is connected in series with the second terminal of the power source between the second terminal and the second input contact of the switching device. Such a configuration with two resistor components which have resistance values of equal magnitude (wherein the resistance value of the first resistor component is equal to the resistance value of the second resistor component) contributes to a high measurement accuracy due to the associated symmetry, in particular in combination with an AC voltage source which is designed to supply the two terminals with mutually opposite-phase AC voltages.

The measuring device can also be configured such that, for at least one of these resistor components connected in series with a terminal of the power source, it can detect the voltage drop across this resistor component as a measuring voltage or measuring voltage signal, and that based on the detected measuring voltage (and eg the known electrical resistance value of the resistor component) it can determine the input current signal.

The contact electrodes may be provided in different configurations. According to an embodiment, the measuring device is configured such that the contact electrodes can be moved relative to the measurement object (or to a measurement object receptacle of the measuring device). The measuring device may in particular be configured such that the contact points of the contact electrodes (provided for contacting the measurement object) are movable relative to the measurement object or to the measurement object receptacle. Accordingly, the measuring device can in particular comprise a measurement object receptacle provided for receiving or storing the measurement object, wherein the contact electrodes are movable relative to the measurement object receptacle. By making the first, second, third and fourth contact electrodes movable relative to the measurement object or the measurement object receptacle, for example, different measurement objects can be characterized by means of the measuring device. In particular, the measurement object is not part of the measuring device. Moreover, the contact electrodes are not permanently connected to the measurement object (in particular not materially bonded). In particular, the contact electrodes may be configured such that they can be moved relative to the measurement object or the measurement object receptacle such that after introducing a measurement object into the measurement object receptacle, the contact electrodes can be brought into contact with the measurement object, then the measurement for characterizing the measurement object can be performed, and after completion of the measurement, the contact electrodes can be brought out of contact with the measurement object, so that subsequently the measurement object can be removed from the measurement object receptacle.

According to an embodiment, the measuring device is also configured such that the contact electrodes are movable relative to one another and thus can be positioned variably relative to one another. The measuring device may in particular be configured such that the contact points of the contact electrodes (provided for contacting the measurement object) are movable or can be variably positioned relative to each other. Accordingly, the positions of the first, second, third and fourth contact electrodes relative to each other (and thus also the contact positions at which the contact electrodes contact the measurement object) can be variably adjusted, so that different contacting geometries are made possible. Accordingly, each of the contact electrodes may be placed and brought into contact with the measurement object at different (eg, any) positions. In this regard, it can be provided, for example, that each of the contact electrodes is arranged at the free end of a flexible electrical conductor (eg a wire) or is formed by the same, so that the contact electrode or its contact point can be variably positioned by positioning the flexible electrical conductor.

According to another embodiment, the measuring device is configured such that the contact electrodes are not movable relative to each other, but are arranged relative to each other in a fixed predetermined geometry. It can be provided, for example, that the contact electrodes are arranged in a fixed predetermined geometry such that the connecting line between the first and the second contact electrode is not parallel and not perpendicular to the connecting line between the third and the fourth contact electrode. It can be provided in particular that the contact electrodes are arranged in a fixed predetermined geometry such that the connecting line between the contact point of the first contact electrode and the contact point of the second contact electrode is not parallel and not perpendicular to the connecting line between the contact point of the third contact electrode and the contact point of the fourth contact electrode. It can be provided, for example, that the four contact electrodes are arranged such that they (or their contact points) form the vertices of a rectangle (preferably an odd-sided rectangle, ie a rectangle in which the length is different than the width), wherein the first and second contact electrodes are diagonally opposite each other, and wherein the third and fourth contact electrodes are diagonally opposite each other. It can be provided, for example, that the measuring device comprises a contact element, wherein the contact electrodes (in particular the first, second, third and fourth contact electrodes) are fixed to the contact element while forming one of the above-explained geometries, so that they are fixed relative to one another in a predetermined geometry. The contact element may be movable relative to the measurement object or relative to the measurement object receptacle. The specified geometries allow a reliable and accurate simultaneous determination of the longitudinal and transverse resistance.

Figure 2A:
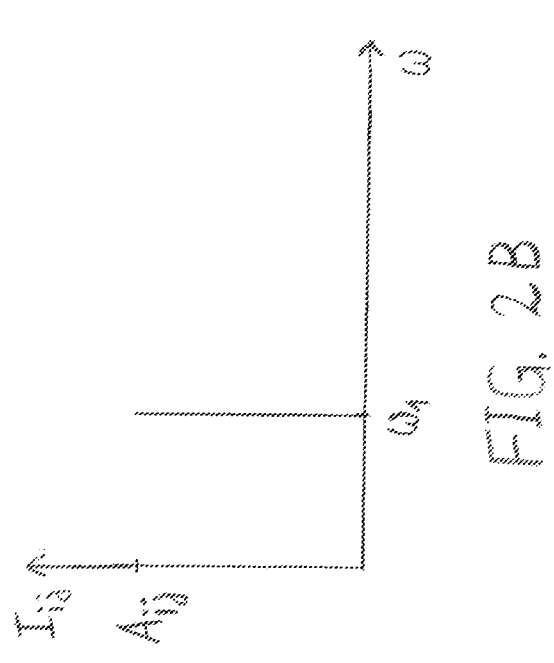
Figure 2B:
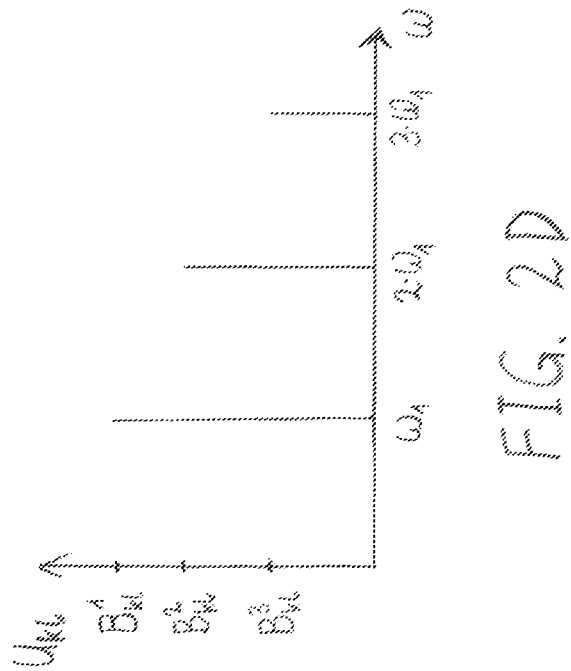
Figure 2C:
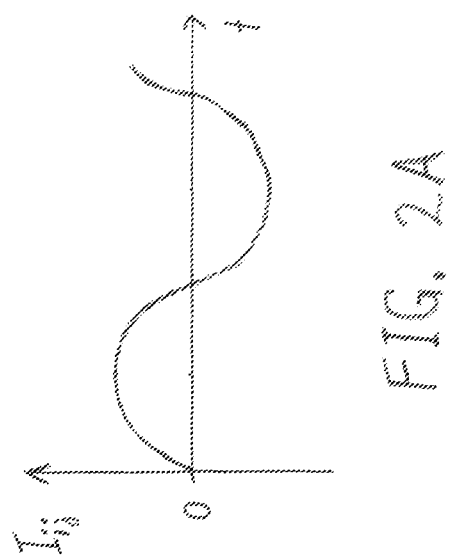
Figure 2D:
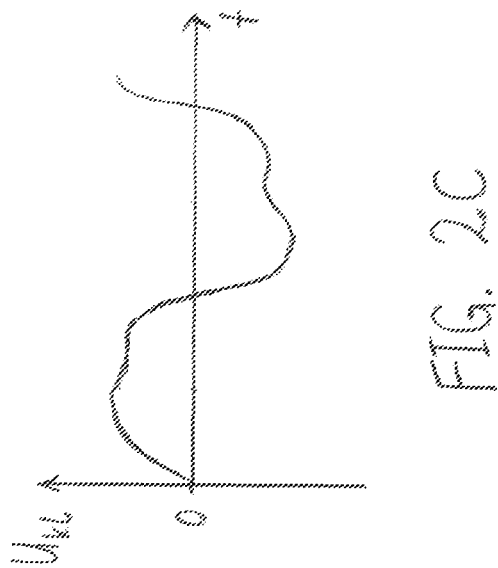
Figure 3:
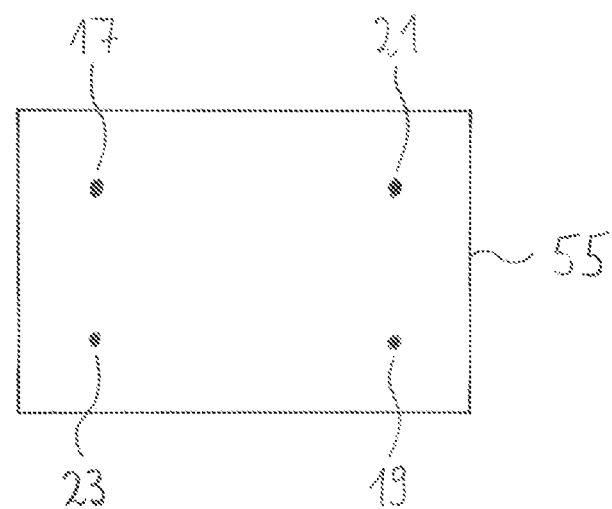
Figure 4:
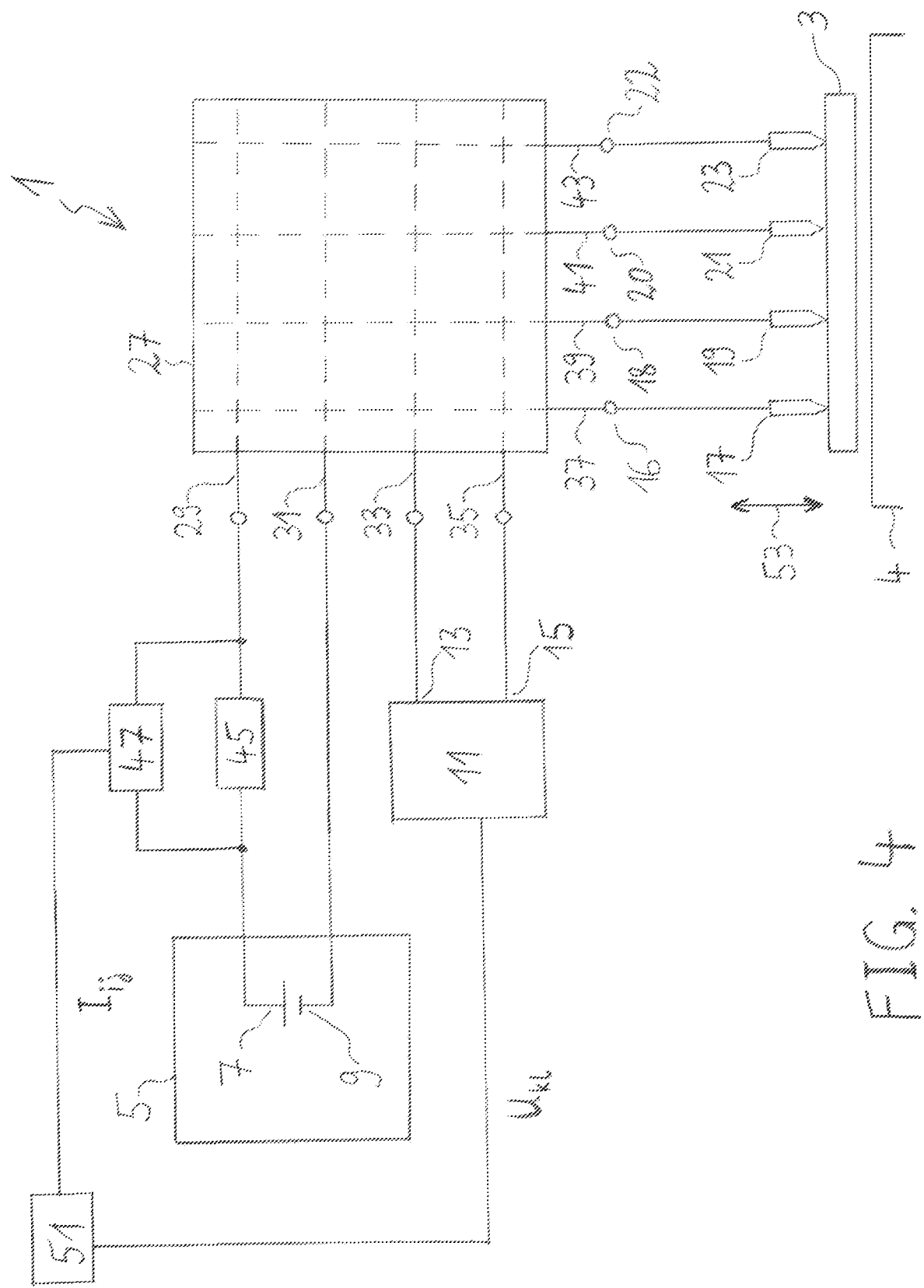

The invention will now be described by way of example with reference to the accompanying figures, in which the same or similar features are given the same reference numerals; here are shown schematically:

FIG. 1 a measuring device according to an embodiment with an AC voltage source when characterizing a measurement object, FIG. 2 an exemplary input current signal (FIG. 2A) and its Fourier transform (FIG. 2B), as well as an exemplary output voltage signal (FIG. 2C) and its Fourier transform (FIG. 2D), FIG. 3 a contact element with contact electrode in a fixed geometry, and FIG. 4 a measuring device according to an embodiment with a DC voltage source when characterizing a measurement object, FIG. 1 shows a measuring device 1 according to an embodiment, characterizing the electrical resistance of a measurementing object 3. The measurement object 3 is in the form of a material layer and is accommodated or stored in a measurement object receptacle 4 or measurement object holder 4 of the measuring device 1.

The measuring device 1 comprises an electrical power source 5 with a first terminal 7 and a second terminal 9. In the embodiment according to FIG. 1, the power source 5 is an electrical 25 alternating voltage source 5, by means of which an electrical alternating voltage is provided, so that when there is an electrically conductive connection between the first 7 and the second 9 terminal, an electric current is provided by the alternating voltage source 5 which is referred to as the input current. Since, according to FIG. 1, the power source 5 is an alternating voltage source, the input current is an alternating current.

The measuring device 1 comprises a voltage measuring device 11 with a first measuring input 13 and a second measuring input 15. The voltage measuring device 11 is configured for detecting the electrical voltage present between the first 13 and the second 15 measuring inputs, which is referred to as the output voltage. Since, according to FIG. 1, the input current is an alternating current, the output voltage is an alternating voltage.

The measuring device 1 also comprises a first contact electrode 17, a second contact electrode 19, a third contact electrode 21 and a fourth contact electrode 23. The contact electrodes are provided for physically and electrically contacting the measurement object 3.

In the intended use of the measuring device 1—as shown in FIG. 1—the contact electrodes 17, 19, 21 and 23 are in physical contact with the measurement object 3, so that the measurement object 3 is electrically contacted by means of the contact electrodes.

The measuring device 1 comprises a switching device 27, which is connected between the power source 5 and the voltage measuring device 11 on the one hand and the contact electrodes 17, 19, 21, 23 on the other hand. The measuring device 1 comprises a first connection contact 16, a second connection contact 18, a third connection contact 20, and a fourth connection contact 22, wherein the connection contacts 16, 18, 20, 22 can be formed, for example, on the switching device 27. The connection contacts 16, 18, 20, 22 may be formed, for example, as connection sockets. The switching device 27 is configured for the variable pairwise electrical connection of in each case one of the first terminal 7, the second terminal 9, the first measuring input 13 and the second measuring input 15, on the one hand, with one of the four connection contacts 16, 18, 20, 22, on the other hand. Each of the connection contacts is connected with one of the contact electrodes by means of a releasable electrical connection (eg a plug connection). The first connection contact 16 is electrically connected to the first contact electrode 17, the second connection contact 18 is electrically connected to the second contact electrode 19, the third connection contact 20 is electrically connected to the third contact electrode 21, and the fourth connection contact 22 is electrically connected to the fourth contact electrode 23. The measuring device 1 or the switching device 27 is thus configured for the variable pairwise electrical connection of in each case one of the first terminal 7, the second terminal 9, the first measuring input 13 and the second measuring input 15 on the one hand and with one of the four contact electrodes 17, 19, 21, 23 on the other hand.

The switching device 27 comprises four electrical input contacts and four electrical output contacts, namely a first input contact 29, a second input contact 31, a third input contact 33, a fourth input contact 35, a first output contact 37, a second output contact 39, a third output contact 41 and a fourth output contact 43. The first input contact 29 is electrically connected to the first terminal 7, the second input contact 31 is electrically connected to the second terminal 9, the third input contact 33 is electrically connected to the first measuring input 13, and the fourth input contact 35 is electrically connected to the second measuring input 15.

The first output contact 37 is electrically connected to the first connection contact 16 (and thus to the first contact electrode 17), the second output contact 39 is electrically connected to the second connection contact 18 (and thus to the second contact electrode 19), the third output contact 41 is electrically connected to the third connection contact 20 (and thus to the third contact electrode 21), and the fourth output contact 43 is electrically connected to the fourth connection contact 22 (and thus to the fourth contact electrode 23). The switching device 27 is configured for variable pairwise electrical connection of in each case one of the input contacts 29, 31, 33, 35 with one of the output contacts 37, 39, 41, 43 (illustrated in FIG. 1 by the intersecting dashed lines, which illustrate the operation of the switching device 27 as a switching matrix).

The measuring device 1 is configured in such a way that the electrical current which is present between the first terminal 7 and the second terminal 9, when the first terminal 7 is electrically connected to the i-th connection contact or the i-th contact electrode and the second terminal 9 is electrically connected to the j-th connection contact or the j-th contact electrode, is detected by it as an input current signal $I_{ij}$ (where i, j=1, 2, 3, 4 and i·j). For this purpose, the measuring device 1 comprises an electrical resistor component 45, which also functions as and is referred to as a measuring resistor 45. The measuring resistor 45 is connected in series with the first terminal 7 between the first terminal 7 and the connection contacts 16, 18, 20, 22 (and thus also between the first terminal 7 and the contact electrodes 17, 19, 21, 23), in particular between the first terminal 7 and the switching device 27. In the present case, the measuring resistor 45 is connected as an example between the first terminal 7 of the power source 5 and the first input contact 29 of the switching device 27.

The measuring device 1 is configured to detect the voltage drop across the measuring resistor 45 as a measuring voltage and to determine the input current signal $I_{ij}$ based on the detected measuring voltage. The measuring device 1 comprises, as an example, a current signal generating device 47 which is designed to pick up or detect the electrical voltage drop occurring across the measuring resistor 45 and determine the electrical current corresponding to this voltage as the input current $I_{ij}$ (eg by forming the input current signal as the quotient of the measuring voltage and the known resistance of the measuring resistor 45). The input current signal $I_{ij}$ describes the input current as a function of time and is therefore also expressed as $I_{ij}=I_{ij}(t)$, where t denotes the time.

According to the embodiment of FIG. 1, the measuring device 1 also comprises a second electrical resistor component 49, which is connected in series with the second terminal 9 between the second terminal 9 and the connection contacts 16, 18, 20, 22 (and thus also between the second terminal 7 and the contact electrodes 17, 19, 21, 23), in particular between the second terminal 9 and the switching device 27. In the present case, as an example, the second resistor component 49 is connected between the second terminal 9 of the power source 5 and the second input contact 31 of the switching device 27. The resistance of the second resistor component 49 is the same as the resistance of the first resistor component 45, as an example the first resistor component 45 and the second resistor component 49 are made to be identical to each other. The second resistor component 49 can also act as a measuring resistor for detecting the input current signal, wherein the measuring device 1 may be configured for detecting the voltage drop across the second resistor component 49 as a measuring voltage and determining the input current signal $I_{ij}$ based on the detected measuring voltage (not shown in FIG. 1). However, it may also be provided that the second resistor component 49 be introduced in addition to the measuring resistor 45 for reasons of symmetry alone.

Due to the electrical input current $I_{ij}$ between the i-th and the j-th contact electrode, an electrical voltage is induced between the two remaining contact electrodes, ie between the k-th and the l-th contact electrode (where k, l=1, 2, 3, 4 and k≠l). One of these two remaining contact electrodes is electrically connected to the first measuring input 13 of the voltage measuring device 11, and the other of these two remaining contact electrodes is electrically connected to the second measuring input 15. The measuring device 1 is configured such that it detects the electrical voltage, which is present between the first measuring input 13 and the second measuring input 15 upon electrical connection of the first measuring input 13 with the k-th contact electrode and electrical connection of the second measuring input 15 with the l-th contact electrode, as an output voltage signal $U_{kl}$. The output voltage signal $U_{kl}$ describes the output voltage as a function of time and is therefore also written as $U_{kl}=U_{kl}(t)$, where t denotes the time.

The measuring device 1 is configured, by means of the switching device 27, for carrying out a first, second, third and fourth measuring sequence as follows.

In the first measurement sequence:
the first connection contact 16 (and thus also the first contact electrode 17) is electrically connected to the first terminal 7, in that the first input contact 29 is electrically connected to the first output contact 37 by the switching device 27,
the second connection contact 18 (and therefore also the second contact electrode 19) is electrically connected to the second terminal 9, in that the second input contact 31 is electrically connected to the second output contact 39 by the switching device 27,
the third connection contact 20 (and thus also the third contact electrode 21) is electrically connected to the first measuring input 13, in that the third input contact 33 is electrically connected to the third output contact 41 by the switching device 27, and
the fourth connection contact 22 (and thus also the fourth contact electrode 23) is electrically connected to the second measuring input 15, in that the fourth input contact 35 is electrically connected to the fourth output contact 43 by the switching device 27,
wherein the input current present between the first 16 and the second 18 connection contact (or between the first 17 and the second 19 contact electrode) is detected as a first input current signal $I_{12}$, and wherein the voltage present between the third 20 and the fourth 22 connection contact (or between the third 21 and the fourth 23 contact electrode) is detected as the first output voltage signal $U_{34}$.

In the second measurement sequence:
the third connection contact 20 (and thus also the third contact electrode 21) is electrically connected to the first terminal 7, in that the first input contact 29 is electrically connected to the third output contact 41 by the switching device 27,
the fourth connection contact 22 (and thus also the fourth contact electrode 23) is electrically connected to the second terminal 9, in that the second input contact 31 is electrically connected to the fourth output contact 43 by the switching device 27,
the second connection contact 18 (and thus also the second contact electrode 19) is electrically connected to the first measuring input 13, in that the third input contact 33 is electrically connected to the second output contact 39 by the switching device 27, and
the first connection contact 16 (and therefore also the first contact electrode 17) is electrically connected to the second measuring input 15, in that the fourth input contact 35 is electrically connected to the first output contact 37 by the switching device 27,
wherein the input current present between the third 20 and the fourth 22 connection contact (or between the third 21 and the fourth 23 contact electrode) is detected as a second input current signal $I_{34}$, and wherein the voltage present between the first 16 and the second 18 connection contact (or between the first 17 and the second 19 contact electrode) is detected as the second output voltage signal $U_{21}$.

In the third measurement sequence:
the second connection contact 18 (and therefore also the second contact electrode 19) is electrically connected to the first terminal 7, in that the first input contact 29 is electrically connected to the second output contact 39 by the switching device 27,
the first connection contact 16 (and thus also the first contact electrode 17) is electrically connected to the second terminal 9, in that the second input contact 31 is electrically connected to the first output contact 37 by the switching device 27,
the fourth connection contact 22 (and thus also the fourth contact electrode 23) is electrically connected to the first measuring input 13, in that the third input contact 33 is electrically connected to the fourth output contact 43 by the switching device 27, and
the third connection contact 20 (and therefore also the third contact electrode 21) is electrically connected to the second measuring input 15, in that the fourth input contact 35 is electrically connected to the third output contact 41 by the switching device 27,
wherein the input current present between the second 18 and the first 16 connection contacts (or between the second 19 and first 17 contact electrode) is detected as a third input current signal $I_{21}$, and wherein the voltage present between the fourth 22 and the third 20 connection contact (or between the fourth 23 and the third 21 contact electrode) is detected as a third output voltage signal $U_{43}$.

In the fourth measurement sequence:
the fourth connection contact 22 (and thus also the fourth contact electrode 23) is electrically connected to the first terminal 7, in that the first input contact 29 is electrically connected to the fourth output contact 43 by the switching device 27, the third connection contact 20 (and therefore also the third contact electrode 21) is electrically connected to the second terminal 9, in that the second input contact 31 is electrically connected to the third output contact 41 by the switching device 27, the first connection contact 16 (and thus also the first contact electrode 17) is electrically connected to the first measuring input 13, in that the third input contact 33 is electrically connected to the first output contact 37 by the switching device 27, and the second connection contact 18 (and therefore also the second contact electrode 19) is electrically connected to the second measuring input 15, in that the fourth input contact 35 is electrically connected to the second output contact 39 by the switching device 27, wherein the input current present between the fourth 22 and the third 20 connection contact (or between the fourth 23 and the third 21 contact electrode) is detected as a fourth input current signal $I_{43}$, and wherein the voltage present between the first 16 and the second 18 connection contact (or between the first 17 and second 19 contact electrode) is detected as the fourth output voltage signal $U_{12}$.

In the embodiment according to FIG. 1, the power source 5 is configured to provide an alternating voltage, the alternating voltage source 5 being configured as an example for providing a harmonic or sinusoidal alternating voltage. As an example, the AC voltage source 5 is configured such that the first terminal 7 and the second terminal 9 are supplied with antiphase AC voltages or AC potentials, so that for the AC voltage $U_1(t)$ applied to the first terminal 7 and the AC voltage $U_2(t)$ applied to the second terminal 9 applies $U_1(t)=-U_2(t)$ (as illustrated in FIG. 1 by the sinusoids phase-shifted by 180°). Alternatively, the AC voltage source 5 may be configured (not shown) such that one of the two terminals (eg, the first terminal 7) is connected to the ground potential of the measuring device 1, and that to the other of the two terminals (eg, the second terminal 9) an alternating voltage potential or an alternating voltage is applied (not shown).

By means of the evaluation device 51, the measuring device 1 is configured for determining the longitudinal resistance $R_{long}$ and the transverse resistance $R_{trans}$ of the measurement object 3 based on the first, second, third and fourth input current signals and based on the first, second, third and fourth output voltage signals, as explained in more detail below.

According to the embodiment of FIG. 1, the measuring device 1 is configured to Fourier-transform the first, second, third and fourth input current signals $I_{ij}(t)$ and to Fourier-transform the first, second, third and fourth output voltage signals $U_{kl}(t)$. In addition, the measuring device 1 is configured to determine the longitudinal resistance $R_{long}$ and the transverse resistance $R_{trans}$ of the measurement object 3 based on the Fourier-transformed input current signals and the Fourier-transformed output voltage signals. In the present case, for example, the input current signals $I_{ij}(t)$ and the output voltage signals $U_{kl}(t)$ are detected as analogue signals, these analogue signals are digitized and thus converted into digital signals, and these digital signals are Fourier-transformed by means of discrete Fourier transformation (also referred to as DFT). This can be realized, for example, by the measuring device 1 having a first analogue-to-digital converter ADC1 for converting the input current signals $I_{ij}(t)$ into digital signals and a first Fourier analyser DFT1 for Fourier-transforming the digitized input current signals by means of DFT, and by the measuring device 1 having a second analogue-to-digital converter ADC2 for converting the output voltage signals $U_{kl}(t)$ into digital signals and a second Fourier analyser DFT2 for Fourier-transforming the digitized output voltage signals by means of DFT. It can also be provided that the analogue-to-digital converters ADC1 and ADC2 as well as the Fourier analysers DFT1 and DFT2 (or their functionality) are implemented in the evaluation device 51.

The harmonic alternating voltage provided by the power source 5 leads to harmonic or sinusoidal input current signals $I_{ij}(t)$ according to equation (11), ie the first input current signal $I_{12}$, the second input current signal $I_{34}$, the third input current signal $I_{21}$ and the fourth input current signal $I_{43}$ can be written in a form according to equation (11).

FIG. 2A shows the time profile of an exemplary harmonic input current signal $I_{ij}(t)$ of the form $$I_{ij}(t)=A_{ij}\sin(\omega_1 t)$$

according to equation (11). FIG. 2B shows the associated Fourier-transformed input current signal $I_{ij}(\omega)$, which is in the form of a frequency domain signal. FIG. 2C shows the time profile of an exemplary output voltage signal $U_{kl}(t)$ caused by the input current signal $I_{ij}(t)$, FIG. 2D showing the associated Fourier-transformed output voltage signal $U_{kl}(\omega)$, which is in the form of a frequency domain signal and according to equation (12) can be written as a weighted sum of several harmonic orders n. In the present case, as an example n=1, 2, 3, so that the output voltage signal can be written as $$U_{kl}(t)=B_{kl}^1\cdot\sin(\omega_1\cdot t)+B_{kl}^2\cdot\sin(2\cdot\omega_1\cdot t)+B_{kl}^3\cdot\sin(3\cdot\omega_1\cdot t),$$

where for the sake of simplicity it has been assumed that the phases $\Phi_{kl}^n$ are zero.

The harmonic-dependent resistance elements $R_{ijkl}^n$ result from the equations (13) to (15), where in the present case due to the vanishing initial phases $\varphi_{kl}^n$ the imaginary part of the harmonic-dependent resistance elements $R_{ijkl}^n$ disappears and the resistance elements $R_{ijkl}^n$ for n=1, 2, 3 are thus given by $R_{ijkl}^1=B_{kl}^1/A_{ij}$, $R_{ijkl}^2=B_{kl}^2/A_{ij}$, and $R_{ijkl}^3=B_{kl}^3/A_{ij}$. From these harmonic-dependent resistance elements $R_{ijkl}^n$ in turn, according to equations (16) and (17) or according to equations (18) and (19), the longitudinal resistance $R_{long}^n$ and the transverse resistance $R_{trans}^n$ can be determined for different harmonic orders n. Accordingly, in the embodiment according to FIG. 1, the evaluation device 51 is configured as an example for evaluating the detected Fourier-transformed input current signals and the Fourier-transformed output voltage signals according to equations (11) to (15), where the longitudinal resistance and the transverse resistance can be determined either according to equations (16) and (17) or according to equations (18) and (19). Since equations (11) to (19) correspond to equations (2) to (10) for n=1, the embodiment according to FIG. 1 is in particular also configured for evaluating the detected signals in accordance with equations (2) to (10). The measuring device 1 is also configured (eg by means of the evaluation device 51 or a data memory implemented therein) for storing the detected input current signals, the detected output voltage signals, and the determined resistance values.

The measuring device 1 comprises a measurement object receptacle 4 for storing the measurement object 3. Each of the contact electrodes 17, 19, 21, 23 is formed with a tip, the tip functioning as a contact point for contacting the measurement object 3. The measuring device 1 is configured such that the first 17, second 19, third 21 and fourth 23 contact electrodes (or their contact points) are movable relative to the measurement object receptacle 4 and the measurement object 3 (illustrated in FIG. 1 by the double arrow 53). In the embodiment of FIG. 1, the measuring device 1 comprises a contact element 55, wherein the contact electrodes 17, 19, 21, 23 are fixed in a fixed predetermined geometry on the contact element 55. The contact element 55 can be moved together with the contact electrodes, along the direction of movement indicated by the double arrow 55, relative to the measurement object receptacle 4. In the embodiment of FIG. 1, the contact electrodes are fixed in such a geometry on the contact element 55 that the connecting line between the first 17 and the second 19 contact electrode is not parallel and not perpendicular to the connecting line between the third 21 and the fourth 23 contact electrode. In the present case, the contact electrodes are arranged as an example such that the contact electrodes (or their contact points) form the vertices of an odd-sided rectangle, with the first 17 and second 19 contact electrodes being arranged diagonally opposite each other, and with the third 21 and fourth 23 contact electrodes being arranged diagonally opposite each other. FIG. 3 illustrates the contact element 55 with the contact electrodes 17, 19, 21 and 23, which are in the form of a scalene rectangle.

FIG. 4 shows a measuring device 1 according to a further embodiment. In contrast to the embodiment according to FIG. 1, in the embodiment according to FIG. 4 the power source 5 is configured as a DC voltage source 5, which provides an electrical direct voltage between the terminals 7 and 9. Thus, in the embodiment of FIG. 4, the input current is a direct current. The measuring device according to FIG. 4 is configured for carrying out the first, second, third and fourth measuring sequences with the corresponding connection configurations already described with reference to FIG. 1, in particular for detecting the associated first, second, third and fourth input current signals $I_{ij}(t)$ and for detecting the first, second, third and fourth output voltage signals $U_{kl}(t)$.

Since the measuring device 1 according to FIG. 4 is operated with a DC voltage, evaluation of the detected input current signals and output voltage signals can be carried out without Fourier transformation here. In contrast to the embodiment according to FIG. 1, in the measuring device 1 according to FIG. 4 thus in particular the analogue-to-digital converters ADC1 and ADC2 as well as the Fourier analysers DFT1 and DFT2 can be dispensed with. In addition, the measuring device 1 according to FIG. 4 is configured without the second resistor component 49.

The measuring device 1 according to FIG. 4, as an example, is configured in such a way that in the respective measurement sequence, by means of the current signal generating device 47 it detects the first input current signal $I_{12}$, the second input current signal $I_{34}$, the third input current signal $I_{21}$, the fourth input current signal $I_{43}$, and by means of the voltage measuring device 11 it detects the first output voltage signal $U_{34}$, the second output voltage signal $U_{21}$, the third output voltage signal $U_{43}$ and the fourth output voltage signal $U_{12}$. Since according to FIG. 4 the input current is a DC current, the output voltage is a DC voltage. The measuring device 1 according to FIG. 4 is configured for determining the longitudinal resistance $R_{long}$ and the transverse resistance $R_{trans}$ of the measurement object 3 based on the first, second, third and fourth input current signals and based on the first, second, third and fourth output voltage signals, as explained in more detail below.

According to the embodiment of FIG. 4, the measuring device 1, according to $R_{ijkl}=U_{kl}/I_{ij}$ according to equation (1), is configured for determining the quotient $U_{34}/I_{12}$ of the first output voltage signal $U_{34}$ and the first input current signal $I_{12}$ as the first resistance value $R_{1234}$, for determining the quotient $U_{21}/I_{34}$ of the second output voltage signal $U_{21}$ and the second input current signal $I_{34}$ as the second resistance value $R_{3421}$, for determining the quotient $U_{43}/I_{21}$ of the third output voltage signal $U_{43}$ and the third input current signal $I_{21}$ as the third resistance value $R_{2143}$, and for determining the quotient $U_{12}/I_{43}$ of the fourth output voltage signal $U_{12}$ and the fourth input current signal $I_{43}$ as a fourth resistance value $R_{4312}$.

From these resistance elements $R_{ijkl}$, the longitudinal resistance $R_{long}$ and the transverse resistance $R_{trans}$ can in turn be determined according to equations (7) and (8) or according to equations (9) and (10). Accordingly, in the embodiment of FIG. 4, the evaluation device 51 as an example is configured for evaluating the detected input current signals and output voltage signals according to equations (1) and (7) to (10), wherein the longitudinal resistance and the transverse resistance may be determined either according to equations (7) and (8) or according to equations (9) and (10).

In contrast to the measuring device according to FIG. 1, in the measuring device according to FIG. 4 the contact electrodes 17, 19, 21, 23 are not fixed by means of a contact element, but are movable relative to one another (whereby also according to FIG. 4 the contact electrodes are movable relative to the measurement object receptacle 4 and the measurement object 3).

Otherwise, the configuration of the measuring device 1 according to FIG. 4 is identical to that according to FIG. 1, so that in this regard reference is made to the explanations made for the embodiment according to FIG. 1.

LIST OF REFERENCE NUMBERS USED

1 Measuring device
3 Measurement object
4 Measurement object receptacle/measurement object holder
5 Electrical power source
7 First terminal of the power source
9 Second terminal of the power source
II Voltage measuring device
13 First measuring input of the voltage measuring device
15 Second measuring input of the voltage measuring device
16 First connection contact
17 First contact electrode
18 Second connection contact
19 Second contact electrode
20 Third connection contact
21 Third contact electrode
22 Fourth connection contact
23 Fourth contact electrode
27 Switching device
29 First input contact of the switching device
31 Second input contact of the switching device
33 Third input contact of the switching device
35 Fourth input contact of the switching device
37 First output contact of the switching device
39 Second output contact of the switching device
41 Third output contact of the switching device
43 Fourth output contact of the switching device
45 First electrical resistor component/measuring resistor
47 Current signal generating device
49 Second electrical resistor component/measuring resistor
51 Evaluation device 53 Freedom of movement of the contact electrodes/the contact element
55 Contact element with contact electrodes fixed thereto
$I_{12}$ First input current signal
$I_{34}$ Second input current signal
$I_{21}$ Third input current signal
$I_{43}$ Fourth input current signal
$U_{34}$ First output voltage signal
$U_{21}$ Second output voltage signal
$U_{43}$ Third output voltage signal
$U_{12}$ Fourth output voltage signal
$U_1$, $U_2$ Antiphase AC voltages/AC potentials
$R_{1234}$ First resistance element
$R_{3421}$ Second resistance element
$R_{2143}$ Third resistance element
$R_{4312}$ Fourth resistance element
$R_{ijkl}^n$ Resistance element for harmonic order n
$R_{trans}$ Transverse resistance
$R_{long}$ Longitudinal resistance
$R_{long}^n$ Longitudinal resistance for harmonic order n
$R_{trans}^n$ Transverse resistance for harmonic order n
ADC1 First analogue-to-digital converter
ADC2 Second analogue-to-digital converter
DFT1 First Fourier analyser
DFT2 Second Fourier analyser

The invention claimed is:

1. A method for characterising an electrical longitudinal resistance of a measurement object, the longitudinal resistance characterizing a ratio between an electrical current running through the measurement object and an electrical voltage present in parallel with this current, the method comprising:

performing, by a measuring device, at least a first and a second measuring sequence, wherein
the measuring device comprises an electric power source having a first terminal and a second terminal for providing the electrical current as an input current, and the measuring device comprises a voltage measuring device having a first measuring input and a second measuring input for detecting the electrical voltage as an output voltage,
in the first measuring sequence, by means of a switching device, electrically connecting a first connection contact to one of the first and the second terminal of the electric power source, electrically connecting a second connection contact to the other of the first and the second terminal of the electric power source, electrically connecting a third connection contact to one of the first and the second measuring input of the voltage measuring device, and electrically connecting a fourth connection contact to the other of the first and the second measuring inputs of the voltage measuring device;
in the first measuring sequence, detecting the input current present between the first and the second connection contacts as a first input current signal;
in the first measuring sequence, detecting the output voltage present between the third and the fourth connection contacts as a first output voltage signal;
in the second measuring sequence, by means of the switching device, electrically connecting the third connection contact to one of the first and the second terminal of the electric power source, electrically connecting the fourth connection contact to the other of the first and the second terminal of the electric power source, electrically connecting the first connection contact to one of the first and the second measuring input of the voltage measuring device, and electrically connecting the second connection contact to the other of the first and the second measuring input of the voltage measuring device;
in the second measuring sequence, detecting the input current present between the third and the fourth connection contacts as a second input current signal; and
in the second measuring sequence, detecting the output voltage present between the first and second connection contacts as a second output voltage signal;
determining, by the measuring device, the longitudinal resistance of the measurement object taking into account the first and the second input current signals and the first and the second output voltage signals;
wherein in all measuring sequences, when the first connection contact is connected to one of the first and the second terminal, the second connection contact is connected to the other of the first and the second terminal, and when the first connection contact is connected to one of the first and the second measuring input, the second connection contact is connected to the other of the first and the second measuring input; and
wherein the switching device is desired for a variable pairwise electrical connection of in each case one of the first terminal, the second terminal, the first measuring input, and the second measuring input, on the one hand, to one of the four connection contacts, on the other hand.

2. The method according to claim 1, wherein the method comprises determining, by the measuring device, a transversal resistance of the measurement object taking into account the first and the second input current signals and the first and the second output voltage signals.

3. The method according to claim 1, wherein, in addition to the first and second measuring sequence, the method comprises performing, by the measuring device, at least a third and fourth measuring sequence, wherein in the first measuring sequence, by means of the switching device, electrically connecting the first connection contact to the first terminal, electrically connecting the second connection contact to the second terminal, electrically connecting the third connection contact to the first measuring input, and eclectically connecting the fourth connection contact to the second measuring input;
in the first measuring sequence, detecting the input current present between the first and the second connection contacts as the first input current signal,
in the first measuring sequence, detecting the electrical voltage present between the third and the fourth connection contacts as the first output voltage signal;
in the second measuring sequence, by means of the switching device, electrically connecting the third connection contact to the first terminal, electrically connecting the fourth connection contact to the second terminal, electrically connecting the second connection contact to the first measuring input, and electrically connecting the first connection contact to the second measuring input;
in the second measuring sequence, detecting the input current present between the third and the fourth connection contacts as the second input current signal; and
in the second measuring sequence, detecting the voltage present between the second and the first connection contacts as the second output voltage signal;

in the third measuring sequence, by means of the switching device, electrically connecting the second connection contact to the first terminal, electrically connecting the first connection contact to the second terminal, electrically connecting the fourth connection contact to the first measuring input, and electrically connecting the third connection contact to the second measuring input;

in the third measuring sequence, detecting the input current present between the second and the first connection contacts as a third input current signal;

in the third measuring sequence, detecting the output voltage present between the fourth and the third connection contacts as a third output voltage signal;

in the fourth measuring sequence, by means of the switching device, electrically connecting the fourth connection contact to the first terminal, electrically connecting the third connection contact to the second terminal, electrically connecting the first connection contact to the first measurement input, and electrically connecting the second connection contact to the second measuring input;

in the fourth measuring sequence, detecting the input current present between the fourth and third connection contacts as a fourth input current signal;

in the fourth measuring sequence, detecting the output voltage present between the first and second connection contacts as a fourth output voltage signal; and determining, by the measuring device, the longitudinal resistance and/or the transversal resistance of the measurement object taking into account the first, second, third, and fourth input current signals and the first, second, third, and fourth output voltage signals.

4. The method according to claim 3, wherein the method comprises determining, by the measuring device, a first resistance value from the first output voltage signal and the first input current signal;

determining, by the measuring device, a second resistance value from the second output voltage signal and the second input current signal;

determining, by the measuring device, a third resistance value from the third output voltage signal and the third input current signal;

determining, by the measuring device, a fourth resistance value from the fourth output voltage signal and the fourth input current signal; and determining, by the measuring device, the longitudinal resistance and/or the transversal resistance of the measurement object on the basis of the first, second, third, and fourth resistance values.

5. The method according to claim 1, wherein the method comprises determining, by the measuring device, a first resistance value from the first output voltage signal and the first input current signal;

determining, by the measuring device, a second resistance value from the second output voltage signal and the second input current signals; and determining, by the measuring device, the longitudinal resistance and/or the transversal resistance of the measurement object based on the first and the second resistance values.

6. The method according to claim 1, wherein the measuring device has a first contact electrode, a second contact electrode, a third contact electrode and a fourth contact electrode for electrically contacting the measurement object, wherein the first contact electrode is connected to the first connection contact, the second contact electrode is connected to the second connection contact, the third contact electrode is connected to the third connection contact and the fourth contact electrode is connected to the fourth connection contact.

7. The method according to claim 1, wherein the input current is an alternating current.

8. The method according to claim 1, wherein the method comprises performing, by the measuring device, a Fourier transformation of the input current signals and/or output voltage signals detected by the measuring device.

9. The method according to claim 8, wherein the method comprises characterising, by the measuring device, the longitudinal resistance and/or the transversal resistance of the measurement object on the basis of the Fourier-transformed input current signals and/or the Fourier-transformed output voltage signals.

10. The method according to claim 1, wherein the switching device has at least a first, a second, a third and a fourth electrical input contact and at least a first, a second, a third and a fourth electrical output contact, wherein the first input contact is electrically connected to the first terminal, the second input contact is electrically connected to the second terminal, the third input contact is electrically connected to the first measuring input, and the fourth input contact is electrically connected to the second measuring input, wherein the first output contact is electrically connected to the first connection contact, the second output contact is electrically connected to the second connection contact, the third output contact is electrically connected to the third connection contact, and the fourth output contact is electrically connected to the fourth connection contact, and wherein the switching apparatus is designed for the variable pairwise electrical connection of in each case one of the input contacts to one of the output contacts.

11. The method according to claim 1, wherein the electrical power source is an AC voltage source, and wherein the AC voltage source is designed for supplying AC voltages in phase opposition to the first and the second terminals.

12. The method according to claim 1, wherein the measuring device comprises at least one resistor component connected in series with one of the two terminals of the power source between this terminal and the connection contacts.

13. The method according to claim 12, wherein the measuring device comprises two resistor components of equal resistance, wherein a first of the two resistor components is connected in series with the first terminal of the power source between the first terminal and the connection contacts, and wherein a second of the two resistor components is connected in series with the second terminal of the power source between the second terminal and the connection contacts.

14. The method according to claim 12, wherein the method comprises detecting, by the measuring device, the voltage dropping across at least one of the resistor components as a measuring voltage and for determining the input current signals on the basis of the detected measuring voltage.

* * * * *

UNITED STATES PATENT AND TRADEMARK OFFICE
CERTIFICATE OF CORRECTION

Page 1 of 1

PATENT NO. : 11,156,574 B2
APPLICATION NO. : 16/483937
DATED : October 26, 2021
INVENTOR(S) : Tobias Kosub and Denys Makarov It is certified that error appears in the above-identified patent and that said Letters Patent is hereby corrected as shown below:

On the Title Page

Item (54) and in the Specification, Column 1, Lines 1-3, delete "APPARATUS FOR CHARACTERIZING THE ELECTRICAL RESISTANCE OF A MEASUREMENT OBJECT" insert --METHOD FOR CHARACTERIZING THE ELECTRICAL RESISTANCE OF A MEASUREMENT OBJECT--
Item (57) ABSTRACT, delete "The invention relates to a measuring apparatus for characterizing the electrical resistance of a measurement object," insert --The invention relates to a measuring method for characterizing the electrical resistance of a measurement object by means of a measuring apparatus,--

In the Specification

Column 1, Line 5, delete "The invention relates to a device for" and insert --The invention relates to a method for--
Column 1, Line 62, delete "The invention is intended to provide a device by" and insert --The invention is intended to provide a method using a device by--
Column 2, Lines 1-3, delete "According to the invention, a device (hereinafter also referred to as measuring device) for characterizing the electrical resistance of a measuring object is provided." and insert --According to the invention, a method for characterizing the electrical resistance of a measuring object by means of a device (hereinafter also referred to as measuring device) is provided.--
Column 2, Lines 45-46, delete "The measuring device can be"
Column 12, Line 29, delete the repeated word "of"
Column 19, Line 8, delete "measurementing object" and insert --measurement object--
Column 21, Line 1, delete "terminal 7" and insert --terminal 9--

Signed and Sealed this
First Day of February, 2022

Drew Hirshfeld
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

PATENT NO. : 11,156,574 B2
APPLICATION NO. : 16/483937
DATED : October 26, 2021
INVENTOR(S) : Tobias Kosub and Denys Makarov It is certified that error appears in the above-identified patent and that said Letters Patent is hereby corrected as shown below:

In the Specification

Column 6, Line 45, delete "current which flows" and insert -- current $I_{ij}$ which flows --

Column 6, Line 58, delete "and the output voltage $U_w$ (t) present between" and insert -- and the output voltage $U_{kl}$ (t) present between --

Column 7, Line 10, delete "$R_{ijkl} = Re(R_{ijkl}) + t \cdot Im(R_{ijkl})$" and insert -- $R_{ijkl} = Re(R_{ijkl}) + i \cdot Im(R_{ijkl})$ --

Column 7, Line 16, delete "$Im(R_{ijkl}) = U_{kl}^1 \cdot \sin(\varphi_{ij}^1 - \varphi_{kl}^1) \, I_{ij}^1$" and insert -- $Im(R_{ijkl}) = U_{kl}^1 \cdot \sin(\varphi_{ij}^1 - \varphi_{kl}^1) / I_{ij}^1$ --

Column 10, Line 55, delete "measuring input is to be noted, wherein for example is not" and insert -- measuring input is to be noted, wherein for example $R_{ijkl}$ is not --

Column 13, Line 3-4, delete "represented by an amplitude $(B_{kl}^n)$, a phase and a frequency" and insert -- represented by an amplitude $(B_{kl}^n)$, a phase $(\varphi_{kl}^n)$ and a frequency --

Column 13, Line 35, delete "$(\varphi_{kl}^n = n \cdot \omega)$ (wherein the frequency $\omega_n$ corresponds to the" and insert -- $(\omega_n = n \cdot \omega)$ (wherein the frequency $\omega_n$ corresponds to the --

Column 13, Line 53, delete "element $\varphi_{kl}^n$ results from the quotient of the amplitude $B_{kl}^n$" and insert -- element $R_{ijkl}^n$ results from the quotient of the amplitude $B_{kl}^n$ --

Column 14, Line 19, delete "$R_{long}^n = P_1 \cdot (R_{1234} - R_{3421})/2 \sim (R_{1234} - R_{3421})$," and insert Signed and Sealed this
Eleventh Day of October, 2022

*Katherine Kelly Vidal*
*Director of the United States Patent and Trademark Office*

-- $R^n_{long} = P_1 \cdot (R^n_{1234} - R^n_{3421})/2 \sim (R^n_{1234} - R^n_{3421})$ --

Column 14, Line 21, delete "$R^n_{trans} = P_2 \cdot (R_{1234}+R_{3421})/2 \sim (R_{1234}+R_{3421})$," and insert
-- $R^n_{trans} = P_2 \cdot (R^n_{1234} + R^n_{3421})/2 \sim (R^n_{1234} + R^n_{3421})$ --

Column 14, Line 45, delete "$R^n_{long} = P_1 \cdot (R_{1234}-R_{3421}+R_{2143}-R_{4312})/4 \sim (R_{1234}-R_{3421}+R_{2143}-R_{4312})$," and insert -- $R^n_{long} = P_1 \cdot (R^n_{1234} - R^n_{3421} + R^n_{2143} - R^n_{4312})/4 \sim (R^n_{1234} + R^n_{3421} + R^n_{2143} + R^n_{4312})$ --

Column 14, Line 48, delete "$R^n_{trans} = P_2 \cdot (R_{1234}+R_{3421}+R_{2143}+R_{4312})/4 \sim (R_{1234}+R_{3421}+R_{2143}+R_{4312})$," and insert -- $R^n_{trans} = P_2 \cdot (R^n_{1234} + R^n_{3421} + R^n_{2143} + R^n_{4312})/4 \sim (R^n_{1234} + R^n_{3421} + R^n_{2143} + R^n_{4312})$ --

Column 19, Line 15, delete "an electrical 25 alternating voltage source 5, by means of" and insert -- an electrical alternating voltage source 5, by means of --

Column 20, Line 37, delete "(where i, j = 1,2,3,4 and i·j)" and insert -- (where i, j = 1,2,3,4 and i ≠ j) --

Column 24, Line 34, delete "that the phases $\Phi^n_{kl}$ are zero." and insert -- that the phases $\varphi^n_{kl}$ are zero. --

Column 26, Line 44, delete "II Voltage measuring device" and insert -- 11 Voltage measuring device --

In the Claims

Column 28, Line 25, (Claim 1) delete "wherein the switching device is desired for a variable" and insert -- wherein the switching device is designed for a variable" --

Column 29, Line 59, (Claim 5) delete "second current input signals" and insert -- second current input signal --